(12) United States Patent
Shimotani et al.

(10) Patent No.: US 11,782,434 B2
(45) Date of Patent: Oct. 10, 2023

(54) DRIVING PLAN GENERATING APPARATUS, REMOTE DRIVING SERVER, AND METHOD FOR GENERATING DRIVING PLAN

(71) Applicant: Mitsubishi Electric Corporation, Tokyo (JP)

(72) Inventors: Mitsuo Shimotani, Tokyo (JP); Tadashi Miyahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 342 days.

(21) Appl. No.: 15/734,150

(22) PCT Filed: Aug. 10, 2018

(86) PCT No.: PCT/JP2018/030060
§ 371 (c)(1),
(2) Date: Dec. 1, 2020

(87) PCT Pub. No.: WO2020/031370
PCT Pub. Date: Feb. 13, 2020

(65) Prior Publication Data
US 2021/0216066 A1 Jul. 15, 2021

(51) Int. Cl.
*B60W 60/00* (2020.01)
*B60W 50/14* (2020.01)
*G05D 1/00* (2006.01)

(52) U.S. Cl.
CPC .......... *G05D 1/0011* (2013.01); *B60W 50/14* (2013.01); *B60W 60/001* (2020.02); *B60W 2050/146* (2013.01)

(58) Field of Classification Search
CPC ......... G05D 1/0011; G05D 2201/0213; B60W 50/14; B60W 60/001; B60W 2050/146; G01C 21/3407
See application file for complete search history.

(56) References Cited

U.S. PATENT DOCUMENTS

2015/0248131 A1* 9/2015 Fairfield ............... B60W 30/00
701/2
2016/0358475 A1* 12/2016 Prokhorov ........... G05D 1/0088
(Continued)

FOREIGN PATENT DOCUMENTS

JP 2006-301963 A 11/2006

OTHER PUBLICATIONS

International Search Report issued in PCT/JP2018/030060 (PCT/ISA/210), dated Oct. 30, 2018.

*Primary Examiner* — Abby Y Lin
*Assistant Examiner* — Renee LaRose
(74) *Attorney, Agent, or Firm* — Birch, Stewart, Kolasch & Birch, LLP

(57) ABSTRACT

The present invention has an object of reducing the number of resident operators in a remote driving system. A driving plan generating apparatus includes: a section selector selecting, as a selected section, at least one incompletely automated driving section; a reservation unit sounding out on reservation of a remote operation of a vehicle in the selected section; and a drive planning unit generating, based on a result of the reservation, a driving plan specifying as a driving mode of the vehicle in the selected section one of a remote driving mode in which a driving control apparatus performs at least a part of driving tasks through the remote operation performed by an operator outside the vehicle and an incompletely automated driving mode in which the driving control apparatus performs at least the part of driving tasks through an operation of a passenger in the vehicle.

14 Claims, 16 Drawing Sheets

(56) References Cited

U.S. PATENT DOCUMENTS

2017/0212525 A1* 7/2017 Wang .................... B60W 50/10
2018/0356814 A1* 12/2018 Brooks ................... B61L 27/14
2020/0033853 A1* 1/2020 Araújo ................. G05D 1/0231

* cited by examiner

| ID | CONTACT NUMBER | WORKING HOUR |
|---|---|---|
| 001 | XX-XXX-XXXX | 9:00-17:00 |
| 002 | YY-YYY-YYYY | 20:00-06:00 |
| 003 | ZZ-ZZZ-ZZZZ | 16:00-22:00 |

F I G. 1 7

| ID | CONTACT NUMBER | WORKING HOUR | SUPPORTED VEHICLE MODEL |
|---|---|---|---|
| 001 | XX-XXX-XXXX | 9:00-17:00 | SEDAN, MINIVAN |
| 002 | YY-YYY-YYYY | 20:00-06:00 | TRUCK |
| 003 | ZZ-ZZZ-ZZZZ | 16:00-22:00 | LIGHT CAR |

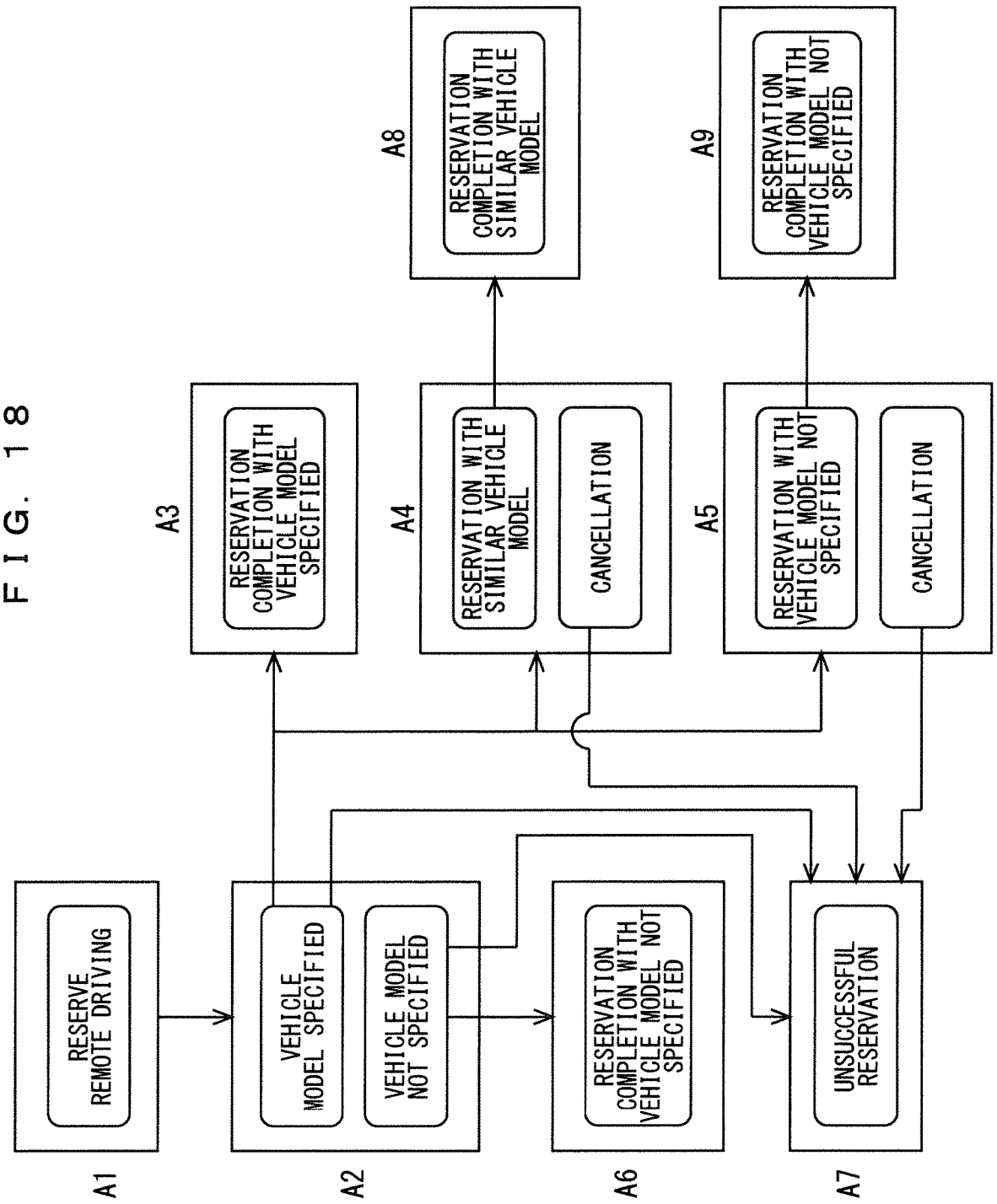

DRIVING PLAN GENERATING APPARATUS, REMOTE DRIVING SERVER, AND METHOD FOR GENERATING DRIVING PLAN

TECHNICAL FIELD

This invention relates to a technology for generating a driving plan of a vehicle capable of automated driving and being remotely driven.

BACKGROUND ART

In recent years, automated driving systems that perform automated driving of vehicles have been actively developed. Under specific conditions, the driver is released from driving operations of the vehicle to which the automated driving system has been applied. The driving modes of such vehicles include an automated driving mode in which a vehicle travels with all actuators operated, and a manual driving mode in which a driver performs the driving operations. The automated driving system determines whether the psychophysiological state of the driver is appropriate for driving when the driving mode of the vehicle is switched from the automated driving mode to the manual driving mode. If the psychophysiological state of the driver is appropriate for driving, the automated driving system allows the driver to perform the manual driving operations. If not, the automated driving system causes the driver to park the vehicle at the roadside or in a parking area.

In recent years, remote driving systems that allow an operator outside a vehicle to remotely operate the vehicle have been studied. For example, Patent Document 1 discloses, when a driver in a vehicle cannot continue to drive the vehicle, a remote driving system that sounds a remote driving service center out on a remote operation and allows an appropriate operator to remotely operate the vehicle.

PRIOR ART DOCUMENT

Patent Document

[Patent Document 1] Japanese Patent Application Laid-Open No. 2006-301963

SUMMARY

Problem to be Solved by the Invention

The application of such a remote driving system to an automated driving system can realize a system that allows an operator outside a vehicle to remotely operate the vehicle when a driver in the vehicle is inappropriate for the driving. However, such a system needs to secure a fixed number of resident operators with some leeway because when and how many remote operations are requested is unknown. Thus, there has been a problem of increase in the personnel cost. Reducing the number of resident operators can cut the personnel cost. However, if the number of requests for remote operations exceeds the number of resident operators, a new problem of the inability to meet the requests for the remote operations occurs.

The present invention has been conceived in consideration of the problems, and has an object of reducing the number of resident operators in a remote driving system.

Means to Solve the Problem

A driving plan generating apparatus according to the present invention includes: a section selector to select, as a selected section in a planned travel route of a vehicle whose driving is controlled by a driving control apparatus, at least one of incompletely automated driving sections to which an automated driving level involving a driving task to be performed by a passenger has been set; a reservation unit to sound out on a reservation of a remote operation of the vehicle in the selected section, based on reservation information including position information on the selected section and information on a scheduled time at which the vehicle travels through the selected section; and a drive planning unit to generate a driving plan based on a result of the reservation, the driving plan specifying, as a driving mode of the vehicle in the selected section, one of a remote driving mode in which the driving control apparatus performs at least a part of driving tasks through the remote operation performed by an operator outside the vehicle and an incompletely automated driving mode in which the driving control apparatus performs at least the part of driving tasks through an operation of the passenger in the vehicle, wherein the driving control apparatus controls the driving of the vehicle according to the driving plan.

Effects of the Invention

According to the present invention, a remote operation in an incompletely automated driving section can be reserved sufficiently ahead of time. Thus, the entity that assigns the remote operation of the vehicle to an operator causes non-resident operators who work part-time to wait at a necessary time according to the number of reservations of remote operations to allow a non-resident operator to perform the remote operation. This can reduce redundant resident operators. The objects, features, aspects, and advantages of the present invention will become more apparent from the following detailed description and the accompanying drawings.

BRIEF DESCRIPTION OF DRAWINGS

FIG. 17 illustrates the operator management information according to Embodiment 3.

FIG. 18 illustrates example transitions of the reservation operation screen according to Embodiment 3.

DESCRIPTION OF EMBODIMENTS

In this Description, a person who remotely operates a vehicle outside the vehicle will be referred to as an "operator", and a person who boards the vehicle and performs a driving operation of the vehicle will be referred to as a "driver". In this Description, a vehicle whose driving is controlled by a driving control apparatus will be simply be referred to as a vehicle.

[A. Embodiment 1]
[A-1. Configuration]

Figure 1:
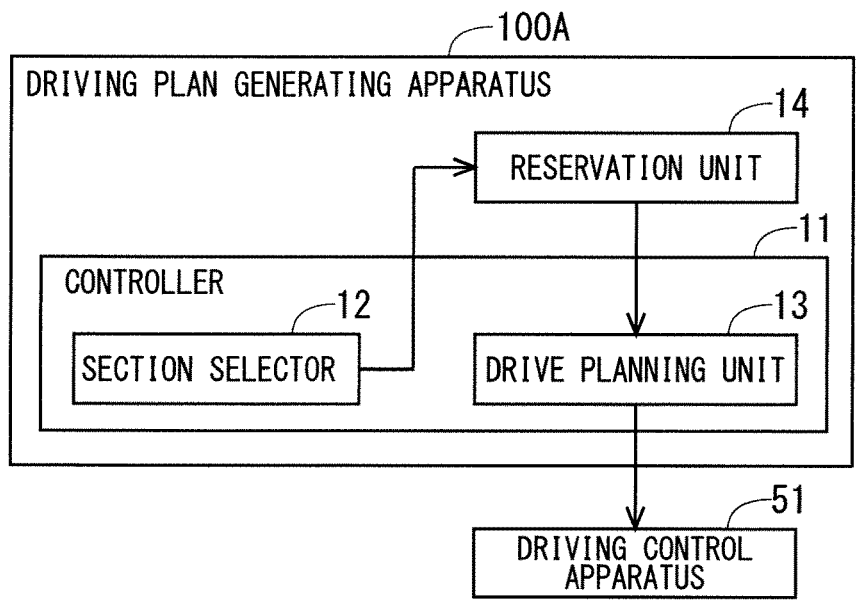
FIG. 1 is a block diagram illustrating a configuration of a remote driving system according to Embodiment 1.

FIG. 1 is a block diagram illustrating a configuration of a remote driving system according to Embodiment 1. The remote driving system according to Embodiment 1 includes a driving plan generating apparatus 100A and a driving control apparatus 51. The driving plan generating apparatus 100A generates a driving plan of a vehicle whose driving is controlled by the driving control apparatus 51. The driving modes in which the driving control apparatus 51 controls the driving of a vehicle include a fully automated driving mode, an incompletely automated driving mode, and a remote driving mode.

The remote driving mode is a mode in which the driving control apparatus 51 performs at least a part of driving tasks through remote operations performed by an operator who does not board the vehicle, that is, who is outside the vehicle.

The fully automated driving mode and the incompletely automated driving mode are modes in which the driving control apparatus 51 controls the driving of the vehicle without relying on the remote operations of the operator. The differences between these two modes are based on the automated driving levels defined for roads. The Society of Automotive Engineers (SAE) defines the automated driving levels as follows.

Level 0: the driver performs all driving tasks.

Level 1: the automated driving with Level 1 is referred to as driving assistance. The system performs sub-tasks of the driving tasks on one of the longitudinal and lateral vehicle controls.

Level 2: the automated driving with Level 2 is referred to as partial driving automation. The system performs the sub-tasks of the driving tasks on both of the longitudinal and lateral vehicle controls.

Level 3: the automated driving with Level 3 is referred to as conditional driving automation. The system performs all the driving tasks in limited areas. When it is difficult to continue the operation, the driver is expected to appropriately respond to, for example, a request to intervene by the system.

Level 4: the automated driving with Level 4 is referred to as high driving automation. The system performs all the driving tasks in the limited areas.

Level 5: the automated driving with Level 5 is referred to as full driving automation. The system performs all the driving tasks.

In this Description, Levels 0 to 3 are referred to as incompletely automated driving, and Levels 4 and 5 are referred to as fully automated driving, using the automated driving levels defined by the SAE. Furthermore, Level 0 is also referred to as full manual driving. The driving control apparatus 51 controls the driving of a vehicle in Level 4 or 5 as the fully automated driving mode, and controls the driving of the vehicle in one of Levels 0 to 3 as the incompletely automated driving mode. In other words, the incompletely automated driving mode is a driving mode in which the driving control apparatus 51 performs at least a part of the driving tasks through operations performed by a passenger in the vehicle and no remote operation is performed. The incompletely automated driving mode includes a plurality of automated driving levels corresponding to the amount of operation tasks performed by the driving control apparatus 51. Furthermore, the incompletely automated driving mode in which the driving of the vehicle is controlled in Level 0 is also referred to as the manual driving mode.

The driving plan generating apparatus 100A includes a controller 11 and a reservation unit 14. The controller 11 controls the entire driving plan generating apparatus 100A. The controller 11 includes a section selector 12 and a drive planning unit 13.

The section selector 12 determines, in a planned travel route of a vehicle, sections whose automated driving levels are Levels 0 to 3 as incompletely automated driving sections, and sections whose automated driving levels are Levels 4 and 5 as fully automated driving sections. The section selector 12 selects at least one of the incompletely automated driving sections as a section in which a reservation of a remote operation is sounded out. The section selected by the section selector 12 is referred to as a selected section.

The reservation unit 14 sounds an entity that assigns an operator (not illustrated in FIG. 1) out on a reservation of a remote operation of the vehicle in the selected section, based on reservation information including position information on the selected section and information on a scheduled time at which the vehicle travels through the selected section. The reservation unit 14 obtains a result of the reservation of the remote operation from the entity that assigns an operator.

The drive planning unit 13 generates a driving plan that specifies one of the remote driving mode and the incompletely automated driving mode as a driving mode of the vehicle in the selected section, based on the result of the reservation of the remote operation. In this Description, generating a driving plan means specifying a driving mode of the vehicle. The drive planning unit 13 determines the driving mode of the vehicle in the selected section as the remote driving mode when the remote operation of the vehicle in the selected section has been reserved. Furthermore, the drive planning unit 13 determines the driving mode of the vehicle in the selected section as the incompletely automated driving mode when the reservation of the remote operation of the vehicle in the selected section is unsuccessful.

[A-2. Operations]

Figure 2:
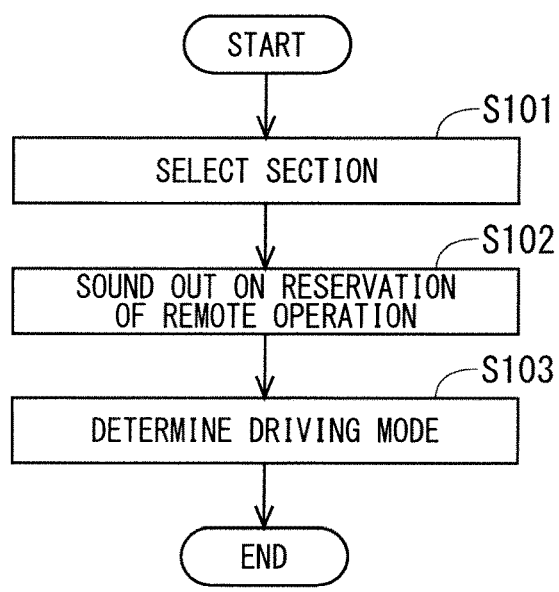
FIG. 2 is a flowchart indicating operations of a driving plan generating apparatus according to Embodiment 1.

FIG. 2 is a flowchart indicating operations of the driving plan generating apparatus 100A. The operations of the driving plan generating apparatus 100A will be described with reference to FIG. 2. First, the section selector 12 divides a planned travel route of the vehicle into fully automated driving sections and incompletely automated driving sections, and selects at least one of the incompletely automated driving sections (Step S101).

Next, the reservation unit 14 reserves a remote operation of the vehicle in the selected section, using the reservation information (Step S102). Then, the drive planning unit 13 determines a driving mode of the vehicle in the selected section based on the result of the reservation in Step S102 to generate a driving plan (Step S103).

[A-3. Advantages]

The driving plan generating apparatus 100A according to Embodiment 1 includes the section selector 12, the reservation unit 14, and the drive planning unit 13. The section selector 12 selects, as a selected section in a planned travel route of the vehicle whose driving is controlled by the driving control apparatus 51, a section to which an automated driving level involving a driving task to be performed by a passenger has been set. The reservation unit 14 sounds out on a reservation of a remote operation of the vehicle in the selected section, based on the reservation information including the position information on the selected section and information on a scheduled time at which the vehicle travels through the selected section. The drive planning unit 13 generates a driving plan based on the result of the reservation. The driving plan specifies one of the remote driving mode and the incompletely automated driving mode as a driving mode of the vehicle in the selected section. The remote driving mode is a mode in which the driving control apparatus 51 performs at least a part of driving tasks through remote operations performed by a remote operator. The incompletely automated driving mode is a mode in which the driving control apparatus 51 performs at least a part of the driving tasks through operations of a passenger in the vehicle. The driving control apparatus 51 controls the driving of the vehicle according to a driving plan.

Since in the driving plan generating apparatus 100A, the remote operation in the selected section is requested in advance, the entity that assigns the remote operation of the vehicle to an operator causes non-resident operators who work part-time to wait at a necessary time according to the number of reservations of remote operations to allow a non-resident operator to perform the remote operation. This can reduce redundant resident operators.

[B. Embodiment 2]

[B-1. Driving Plan Generating Apparatus]

Figure 3:
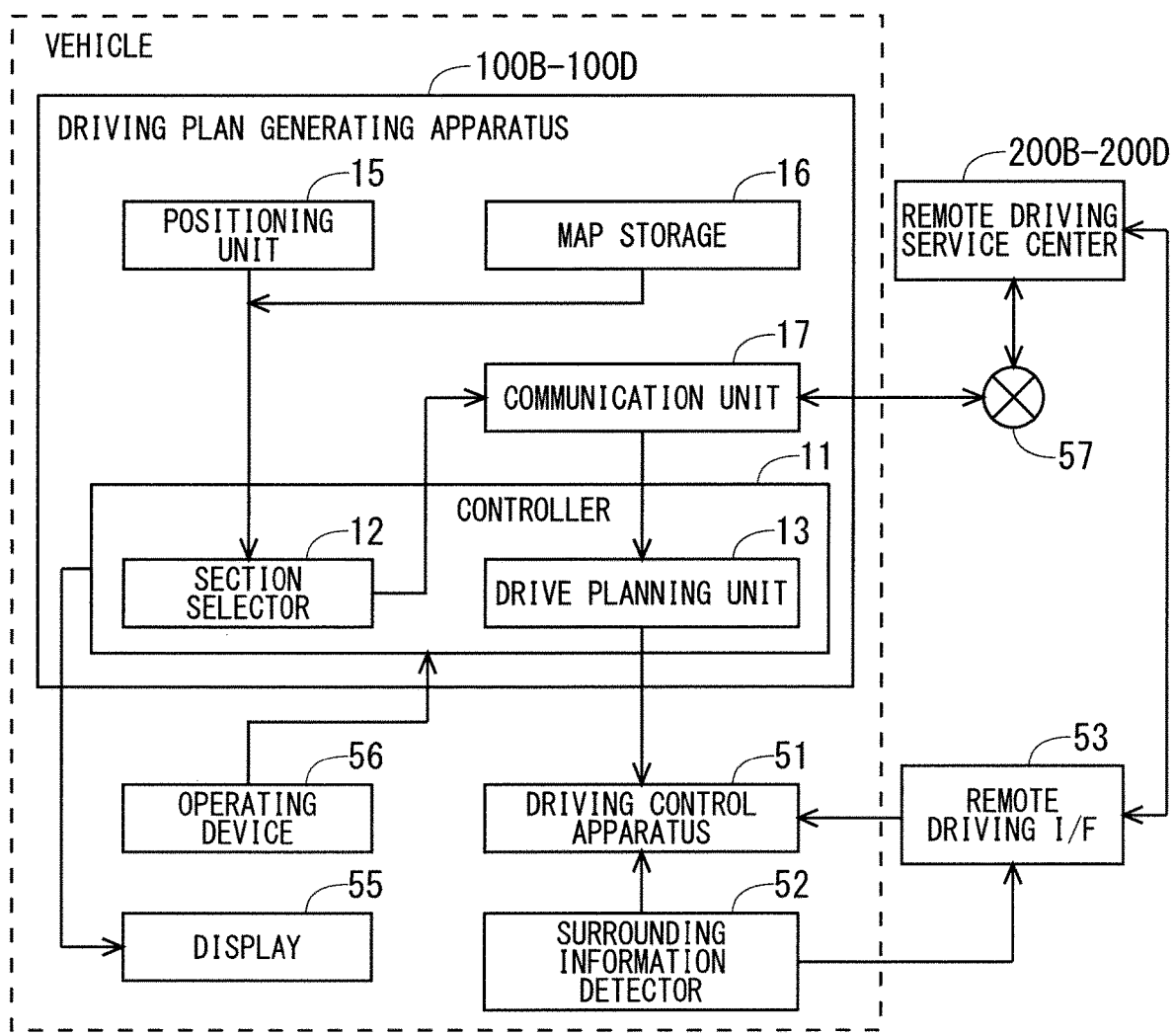
FIG. 3 is a block diagram illustrating a configuration of a remote driving system according to Embodiment 2.

FIG. 3 is a block diagram illustrating a configuration of a remote driving system according to Embodiment 2. The remote driving system according to Embodiment 2 includes a driving plan generating apparatus 100B and a remote driving service center 200B. Each configuration of a driving plan generating apparatus 100C according to Embodiment 3 and a driving plan generating apparatus 100D according to Embodiment 4 to be described later is identical to that of the driving plan generating apparatus 100B.

FIG. 3 illustrates the driving plan generating apparatus 100B as an in-vehicle apparatus. Embodiment 2 will be described based on this. However, all the constituent elements of the driving plan generating apparatus 100B need not be mounted on a vehicle. The constituent elements of the driving plan generating apparatus 100B may be appropriately included in a server outside the vehicle or in a mobile terminal such as a smartphone or a PDA.

The driving plan generating apparatus 100B includes the controller 11, a positioning unit 15, a map storage 16, and a communication unit 17. The controller 11 includes the section selector 12 and the drive planning unit 13. In other words, the driving plan generating apparatus 100B includes the positioning unit 15 and the map storage 16 in addition to the configuration of the driving plan generating apparatus 100A according to Embodiment 1, and further includes the communication unit 17 instead of the reservation unit 14.

The positioning unit 15 obtains the position information from the Global Navigation Satellite System (GNSS), or obtains information detected by a vehicle sensor that is not illustrated and measures the position of the vehicle based on this.

Map data is stored in the map storage 16. The map data stored in the map storage 16 covers at least roads from a start point to a destination of the vehicle. The map data includes information on the automated driving level for each section which is described in Embodiment 1. Here, the information on the automated driving level may be information for allowing the driving plan generating apparatus 100B to determine an automated driving level in which the vehicle can travel, such as information directly indicating the automated driving level in which the vehicle can travel, a road maintenance state, or infrastructure information. As long as the map data is available as necessary, the driving plan generating apparatus 100B need not always include the map storage 16. The driving plan generating apparatus 100B may obtain the map data at any time from, for example, an external server of the driving plan generating apparatus 100B that is not illustrated.

The section selector 12 obtains the position information of the vehicle from the positioning unit 15, obtains the map data from the map storage 16, and obtains information on the destination of the vehicle from an operating device 56. The section selector 12 searches for a planned travel route from the current location to the destination of the vehicle, based on these pieces of information. As described in Embodiment 1, the section selector 12 divides the planned travel route into fully automated driving sections and incompletely automated driving sections according to automated driving levels, and selects a selected section from among the incompletely automated driving sections as a reservation target section. The section selector 12 can reference to the automated driving levels of the planned travel route in the map data.

The communication unit 17 is connected to the remote driving service center 200B outside the vehicle via a network 57, and communicates with the remote driving service center 200B. The communication unit 17 transmits, to the remote driving service center 200B, the reservation information including the position information on the selected section and information on a scheduled time at which the vehicle travels through the selected section to sound out on a reservation of a remote operation in the selected section. The communication unit 17 obtains a result of the reservation from the remote driving service center 200B. As such, the communication unit 17 functions as a reservation unit.

The drive planning unit 13 obtains the result of the reservation from the communication unit 17, and generates a driving plan based on the result of the reservation. The method for generating a driving plan is the one already described in Embodiment 1. Next, the configuration around the driving plan generating apparatus 100B will be described. The driving plan generating apparatus 100B is connected to the driving control apparatus 51, a surrounding information detector 52, a remote driving interface (I/F) 53, the remote driving service center 200B, a display 55, and the operating device 56, and is configured to use these.

The driving control apparatus 51 is the one already described in Embodiment 1.

The surrounding information detector 52 detects surrounding information of the vehicle. The surrounding information detected by the surrounding information detector 52 includes surrounding information necessary for the driving control apparatus 51 to perform automated driving, and surrounding information necessary for the operator to perform a remote operation. The former surrounding information includes a recognition result of an image captured by a camera mounted on the vehicle, or information detected by, for example, a laser radar, a ultrasonic sensor, or a millimeter wave radar. The latter surrounding information includes a captured surrounding image of a surrounding area of the vehicle which corresponds to the sight of the driver.

The remote driving I/F 53 is an interface for an operator to perform a remote operation, using a remote operation facility 82 (see FIG. 11 to be described later) in the remote driving service center 200B. The remote driving I/F 53 obtains remote operation information from the remote operation facility 82, and outputs the remote operation information to the driving control apparatus 51. Furthermore, the remote driving I/F 53 obtains the surrounding information, for example, a surrounding image from the surrounding information detector 52, and outputs the surrounding information to the remote operation facility 82.

The display 55 is, for example, a liquid crystal display or a head-up display (HUD) mounted on the vehicle, and displays a route screen or a reservation operation screen to be described later to the driver. The display 55 may be configured as a display in an instrument panel.

The operating device 56 is a device that receives operation information from the passenger in the vehicle. The operating device 56 is, for example, a mechanical switch or a touch panel. When the operating device 56 is a touch panel, the operating device 56 may be integrally configured with the display 55 as a touch screen.

Figure 4:
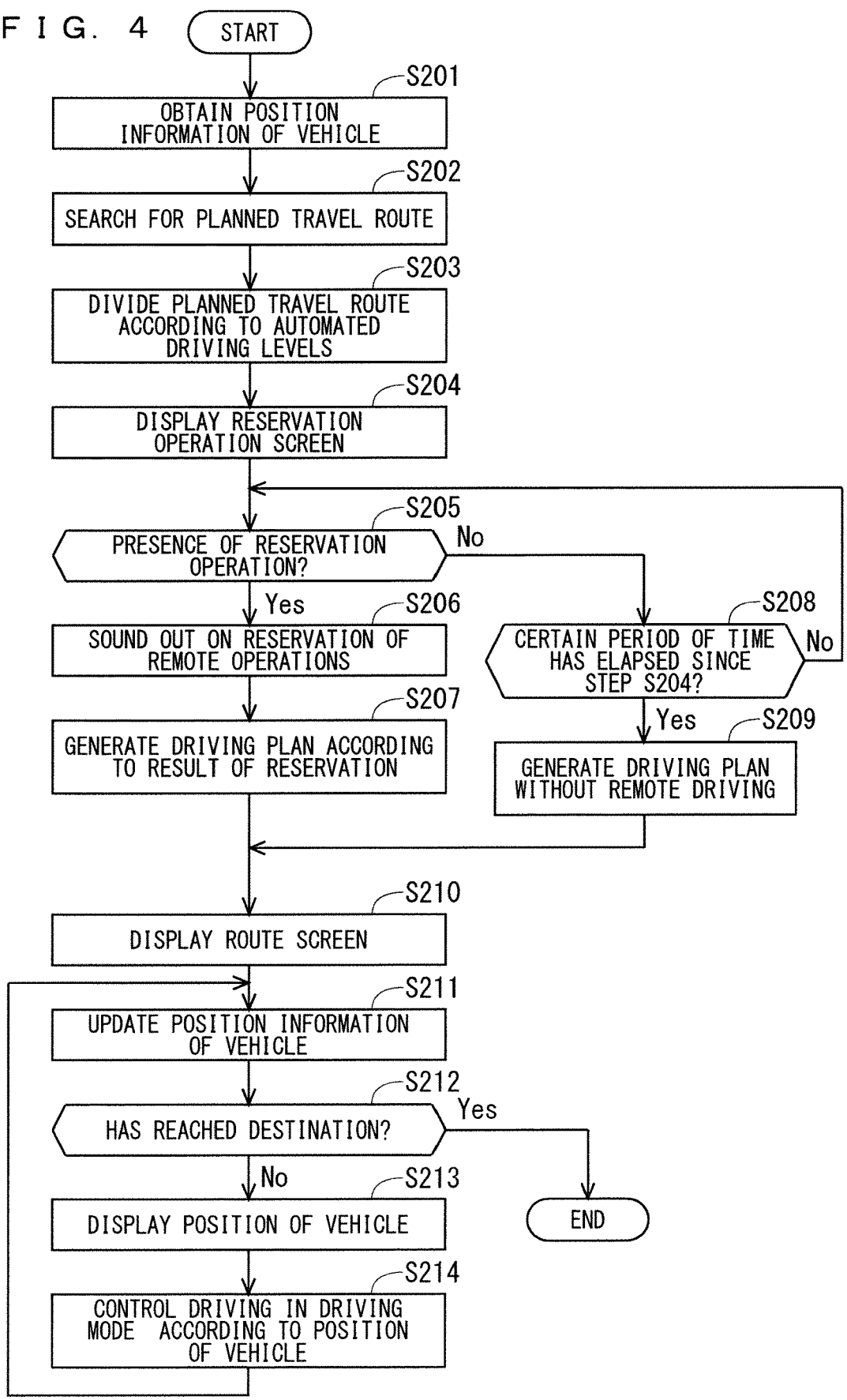
FIG. 4 is a flowchart indicating operations of a driving plan generating apparatus according to Embodiment 2.

FIG. 4 is a flowchart indicating operations of the driving plan generating apparatus 100B. The operations of the driving plan generating apparatus 100B will be described with reference to FIG. 4. The procedure in FIG. 4 is started with timing, for example, before a vehicle starts to travel or when an accessory power source of the vehicle is turned ON.

First, the section selector 12 obtains the current position information of the vehicle from the positioning unit 15 (Step S201). Next, the section selector 12 obtains information on a destination of the vehicle from the operating device 56, and obtains the map data from the map storage 16. The section selector 12 searches for a planned travel route of the vehicle from the current location to the destination, based on the current position information of the vehicle, position information on the destination, and the map data (Step S202). The controller 11 may cause the display 55 to display a screen prompting an input of the destination in this Step.

Next, the section selector 12 understands automated driving levels of the planned travel route with reference to the map data, and divides the planned travel route into fully automated driving sections and incompletely automated driving sections according to the automated driving levels (Step S203).

Figure 5:
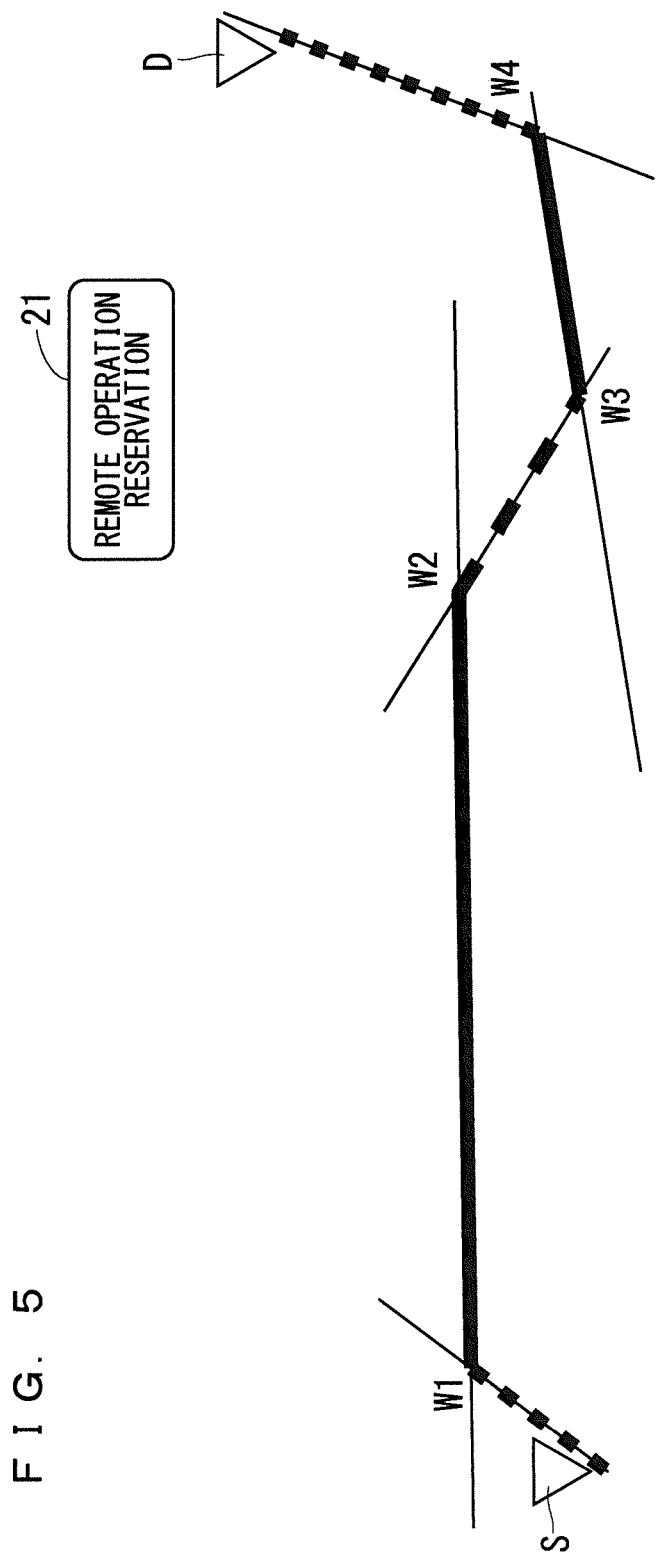
FIG. 5 illustrates an example reservation operation screen.

Next, the controller 11 causes the display 55 to display a reservation operation screen (Step S204). The reservation operation screen is a screen for allowing the passenger to select a section to be reserved for a remote operation of the vehicle in the planned travel route, for example, the screen illustrated in FIG. 5. As illustrated in FIG. 5, the divided sections of the planned travel route from a start point S that is a current location of the vehicle to a destination D, and a remote operation reservation button 21 are displayed in the reservation operation screen. The planned travel route is divided by points W1, W2, W3, and W4 in addition to the start point S and the destination D. A section S-W1, which is an incompletely automated driving section in the automated driving level 0, is represented by a dotted line. Furthermore, sections W1-W2 and W3-W4, which are fully automated driving sections in the automated driving level 4, are represented by solid lines. Furthermore, sections W2-W3 and W4-D, which are incompletely automated driving sections in the automated driving levels 3 and 2, respectively, are represented by dotted lines. As such, the incompletely automated driving sections are represented by the dotted lines, and the fully automated driving sections are represented by the solid lines in the reservation operation screen. Since these sections are displayed in different forms, the passenger can easily identify the incompletely automated driving sections to be reservation target sections for remote operations.

Once the passenger selects sections that he/she wishes to reserve on the reservation operation screen and presses the remote operation reservation button 21, the operating device 56 enters the sections that he/she wishes to reserve, that is, information on the selected sections into the controller 11. Here, the sections W2-W3 and W4-D are the selected sections. Upon receipt of the information on the selected sections, the controller 11 determines the presence of a reservation operation (Step S205). Then, the section selector 12 outputs, to the communication unit 17, the reservation information including the position information on the selected sections and the information on a scheduled time at which the vehicle travels through each of the selected sections. The communication unit 17 transmits the reservation information to the remote driving service center 200B via the network 57 to sound the remote driving service center 200B out on the reservation of the remote operations in the selected sections (Step S206).

The remote driving service center 200B performs an operation of assigning an operator who remotely drives the vehicle in the selected sections (details will be described later). The remote driving service center 200B returns a result of the reservation to the communication unit 17 of the driving plan generating apparatus 100B as "reservation accepted" when the remote driving service center 200B can assign an operator or "reservation rejected" when the remote driving service center 200B cannot assign an operator. Once obtaining the result of the reservation, the communication unit 17 outputs it to the drive planning unit 13. The drive planning unit 13 generates a driving plan of the planned travel route according to the result of the reservation (Step S207). Specifically, the drive planning unit 13 determines a driving mode in a fully automated driving section as the fully automated driving mode and a driving mode in an incompletely automated driving section as the incompletely automated driving mode, in sections other than the selected sections. Furthermore, the drive planning unit 13 determines a driving mode in the selected sections as the remote driving mode when the reservation is accepted, and a driving mode in the selected sections as the incompletely automated driving mode when the reservation is rejected.

If no information on the selected sections is entered into the controller 11 for a certain period of time (Yes in Step S208) since the reservation operation screen is displayed (Step S204), the drive planning unit 13 generates a driving plan without remote driving (Step S209). Specifically, the drive planning unit 13 determines a driving mode in a fully automated driving section as the fully automated driving mode and a driving mode in an incompletely automated driving section as the incompletely automated driving mode.

Figure 6:
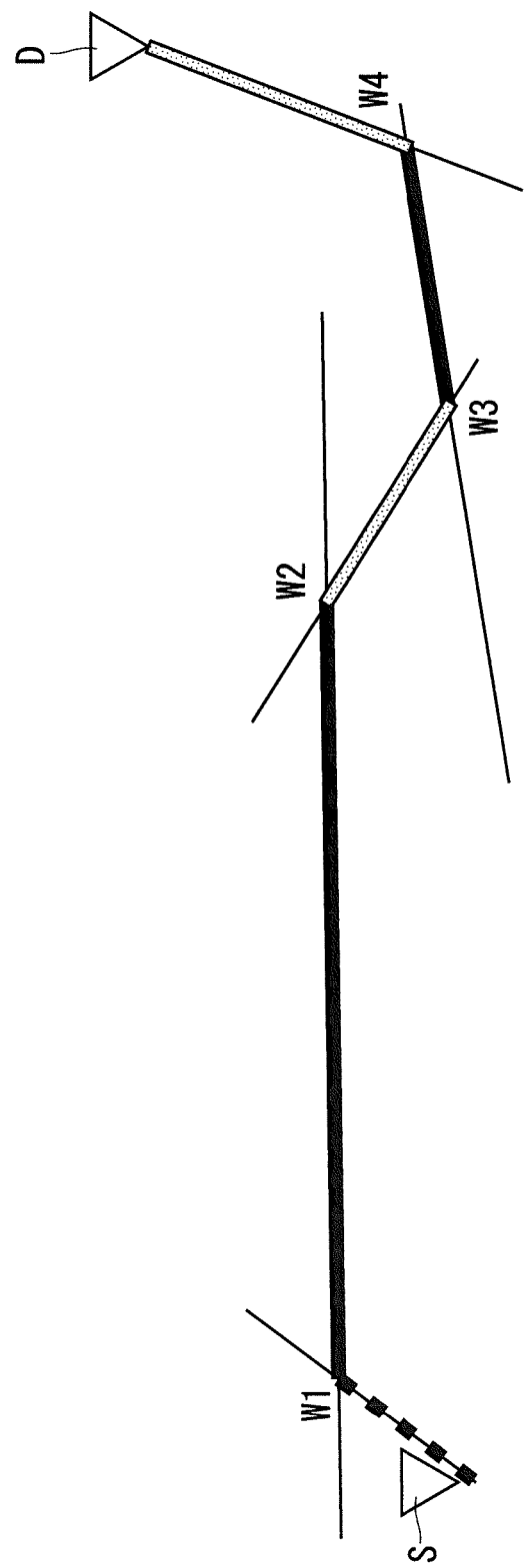
FIG. 6 illustrates an example route screen when a reservation has been successful.
Figure 7:
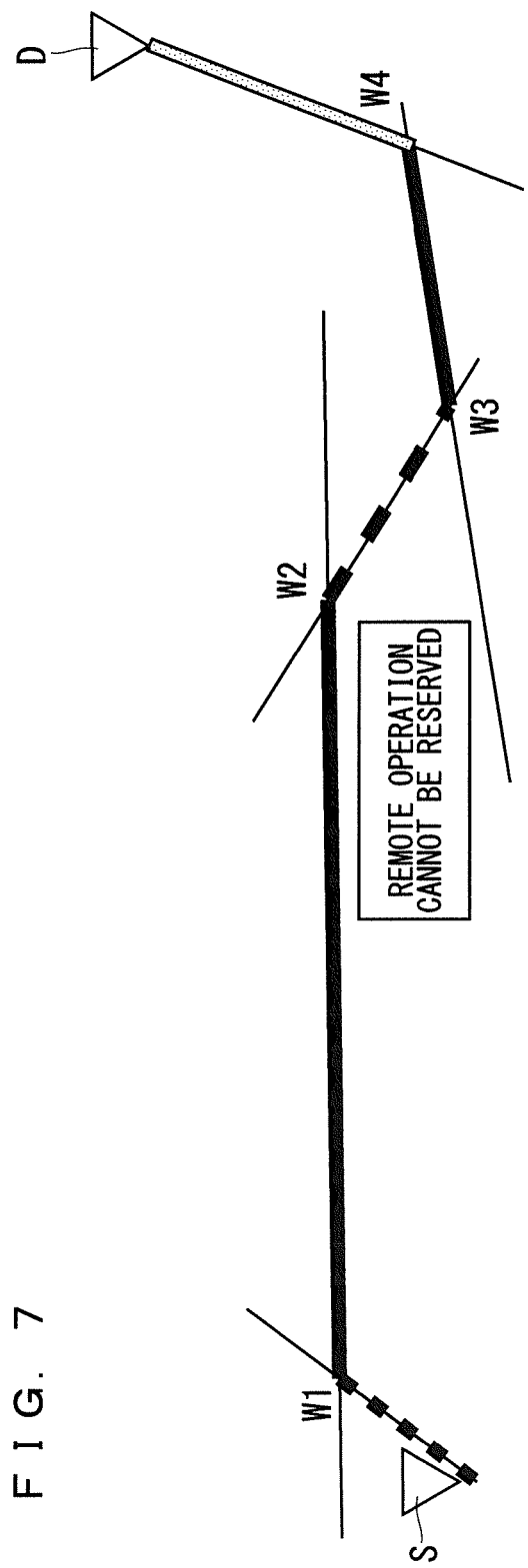
FIG. 7 illustrates an example route screen when a part of the reservation is unsuccessful.

After the drive planning unit 13 generates a driving plan in Step S207 or S209, the controller 11 causes the display 55 to display the route screen (Step S210). FIGS. 6 and 7 illustrate example route screens. The section S-W1 represented by the dotted line in the route screen of FIG. 6 indicates that the driving mode in this section is the incompletely automated driving mode. Furthermore, the sections W1-W2 and W3-W4 represented by the solid lines indicate that the driving mode in these sections is the fully automated driving mode. Furthermore, the sections W2-W3 and W4-D represented by dotted-pattern lines indicate that the driving mode in these sections is the remote driving mode. When the reservation of remote operations in the selected sections is accepted, the route screen as illustrated in FIG. 6 is displayed.

When the reservation of remote operations in the selected sections is rejected, the route screen as illustrated in FIG. 7 is displayed. The section W2-W3 represented by the dotted line in the route screen of FIG. 7 indicates that the driving mode in this section is the incompletely automated driving mode. Furthermore, a message "REMOTE OPERATION CANNOT BE RESERVED" is attached to the dotted line representing the section W2-W3. Since the reservation of the remote operation in the section W2-W3 is rejected, the passenger can understand that the driving mode in this section is set to the incompletely automated driving mode. As such, the route screen shows a driving mode in each section of a planned travel route, and an availability status of the reservation of the remote operation.

After controlling displaying of the route screen in Step S210, the controller 11 updates the position information of the vehicle (Step S211). In other words, the controller 11 obtains the current position information of the vehicle from the positioning unit 15. Then, the controller 11 determines whether the vehicle has reached the destination (Step S212), and ends the processes when the vehicle has reached the destination. If the vehicle has not reached the destination, the controller 11 controls displaying of a position of the vehicle (Step S213).

Figure 8:
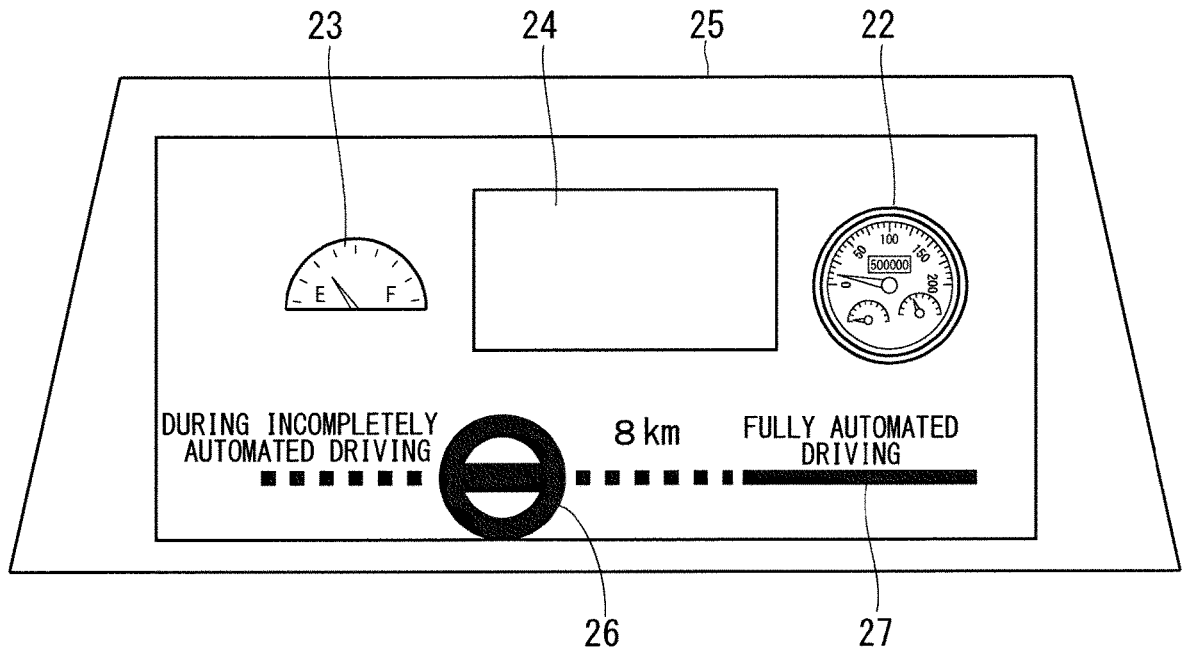
FIG. 8 is a display example of an instrument panel when a vehicle is traveling through an incompletely automated driving section.
Figure 9:
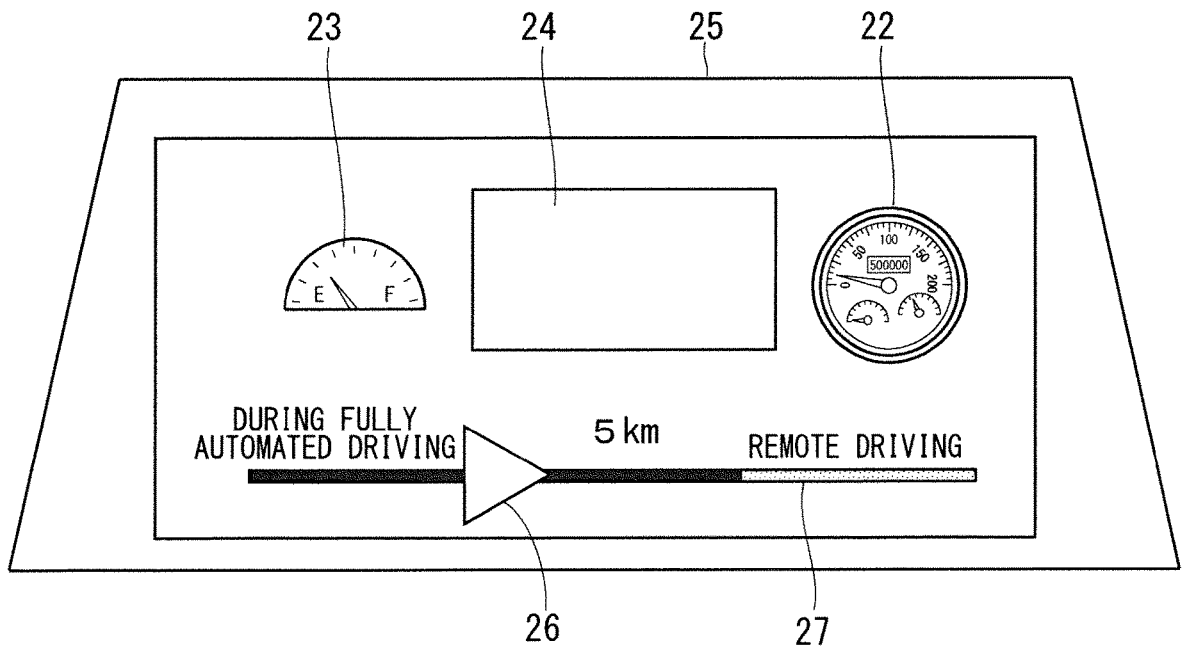
FIG. 9 is a display example of the instrument panel when the vehicle is traveling through a fully automated driving section.
Figure 10:
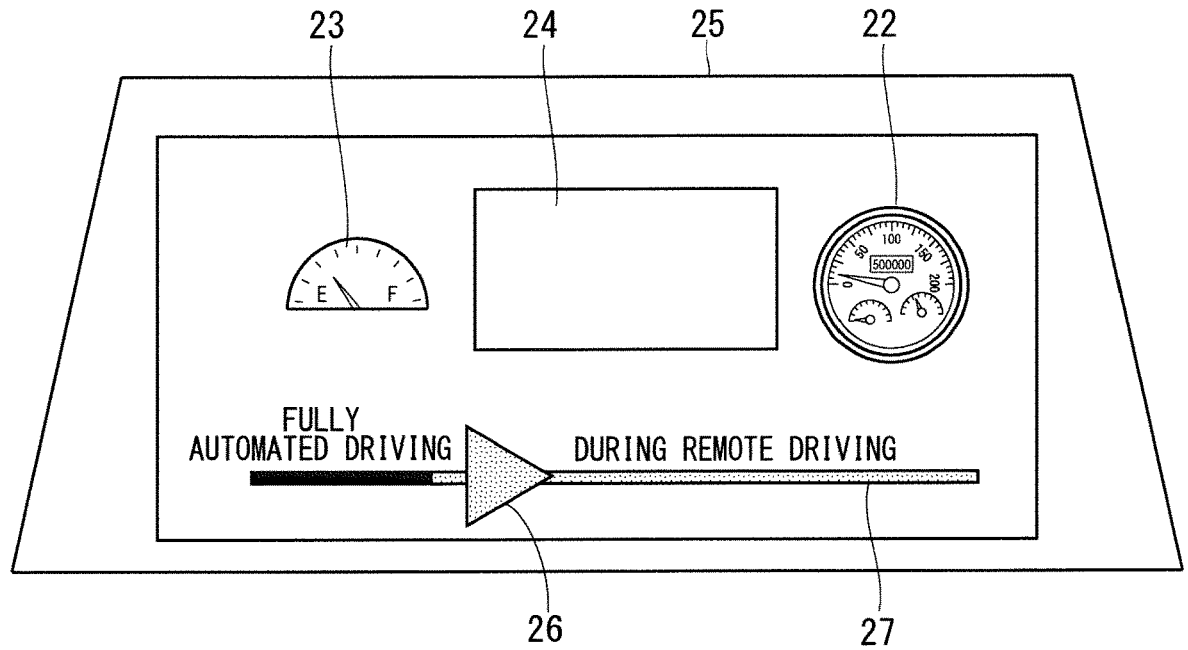
FIG. 10 is a display example of the instrument panel immediately after the vehicle enters a remote operation section from a fully automated driving section.

FIGS. 8 to 10 are display examples of the position of the vehicle when the display 55 is an instrument panel 25. The instrument panel 25 includes a tachometer 22, a fuel gauge 23, and a display area 24 as well as an area for displaying a vehicle icon 26 and a mode bar 27 showing driving modes in a planned travel route. The driving modes in the planned travel route in each of FIGS. 8 to 10 are based on FIG. 6.

The mode bar 27 shows a driving mode of a section in which the vehicle is traveling, and a driving mode in the next section. FIG. 8 is a display example while the vehicle is traveling through the section S-W1. In FIG. 8, the mode bar 27 is displayed by the dotted line representing the section S-W1 and the solid line representing the next section W1-W2. As the vehicle is traveling along the planned travel route, the display of the mode bar 27 is changed. In FIG. 8, the vehicle icon 26 superimposed over the dotted line of the mode bar 27 is displayed. This indicates that the vehicle is traveling in the incompletely automated driving mode. Furthermore, "8 km" is displayed between the vehicle icon 26 and the solid line of the mode bar 27. This indicates that the vehicle is switched to the completely automated driving mode at a point 8 km from here. The route screen in FIG. 6 may be displayed in the display area 24.

FIG. 9 is a display example when the vehicle is traveling at a point 5 km from the point W2 in the section W1-W2. Since the vehicle is traveling in the completely automated driving mode, the vehicle icon 26 superimposed over the solid line of the mode bar 27 is displayed. Furthermore, "5 km" is displayed between the vehicle icon 26 and the dotted-pattern line of the mode bar 27. This indicates that the vehicle is switched to the remote driving mode at a point 5 km from here.

FIG. 10 is a display example when the vehicle is traveling near the point W2 in the section W2-W3. Since the vehicle is traveling in the remote driving mode, the vehicle icon 26 superimposed over the dotted-pattern line of the mode bar 27 is displayed.

The position indications of the vehicle illustrated in FIGS. 8 to 10 enable the passenger to understand a distance until the current driving mode of the vehicle is switched to the next driving mode. Although each of FIGS. 8 to 10 illustrates the distance until the current driving mode is switched to the next driving mode, the time until the current driving mode is switched to the next driving mode may be displayed instead of the distance. This time can be calculated from, for example, an average speed of the vehicle. Whatever the display is, the passenger can understand the timing at which the current driving mode is switched to the next driving mode.

The driving control apparatus 51 obtains the driving plan from the drive planning unit 13, and controls the driving of the vehicle in a driving mode specified according to a position of the vehicle in the traveling plan (Step S214). As illustrated in FIG. 8, when the vehicle is traveling through the incompletely automated driving section which is not the selected section, the driving control apparatus 51 controls the driving of the vehicle in the incompletely automated driving mode. In other words, the driving control apparatus 51 performs automated driving control on a predetermined actuator according to an automated driving level at the traveling position of the vehicle to realize the incompletely automated driving. Furthermore, as illustrated in FIG. 9, when the vehicle is traveling through the fully automated driving section, the driving control apparatus 51 controls the driving of the vehicle in the fully automated driving mode. In other words, the driving control apparatus 51 performs automated driving control on all the actuators to realize the fully automated driving.

Furthermore, as illustrated in FIG. 10, when the vehicle is traveling through the selected section in which the remote operation has been reserved for the vehicle, the driving control apparatus 51 controls the driving of the vehicle in the remote driving mode. The driving tasks to be remotely performed in the remote driving mode may be all the driving tasks or a part of the driving tasks according to the automated driving level in the selected section. For example, when the automated driving level in the selected section is Level 2, the driving control apparatus 51 performs automated driving control on "the sub-tasks of the driving tasks on both of the longitudinal and lateral vehicle controls" whose automation is defined in the automated driving level, and controls the driving on the remaining driving tasks through remote operations. Alternately, the driving control apparatus 51 controls the driving on all the driving tasks through remote operations.

[B-2. Remote Driving Service Center]

Figure 11:
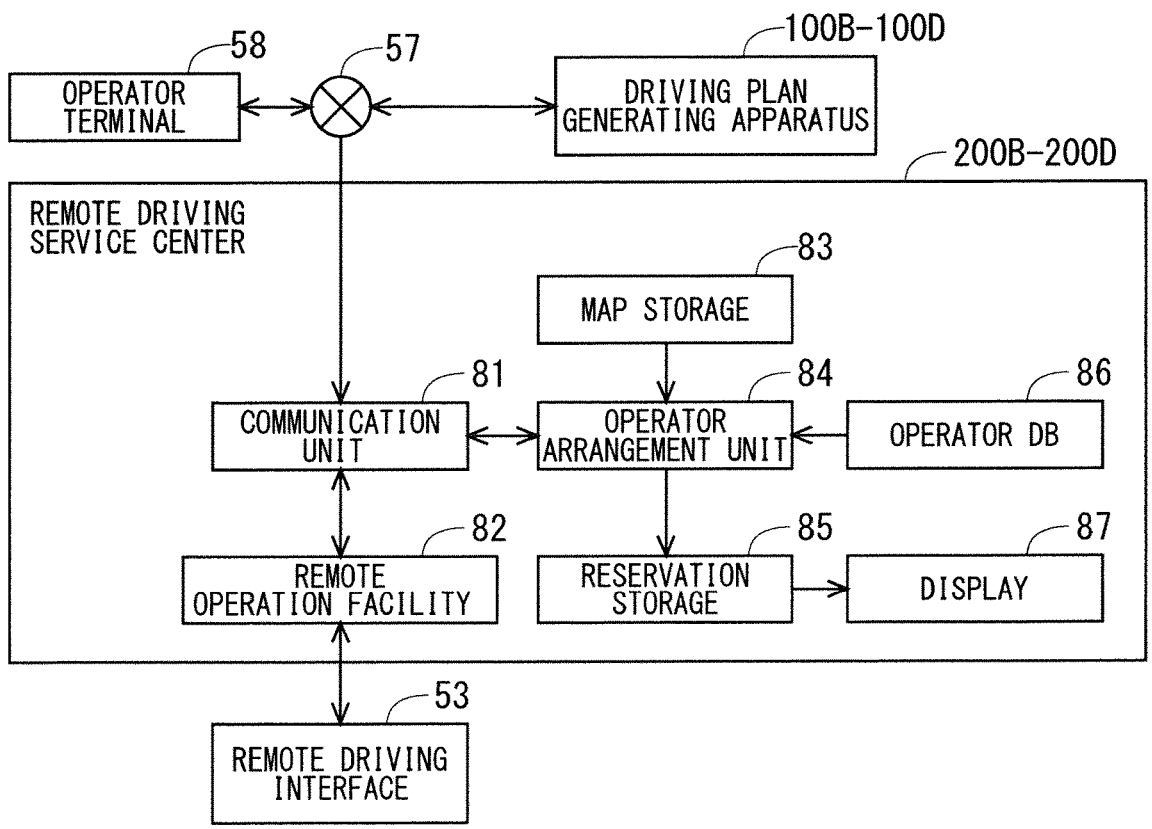
FIG. 11 is a block diagram illustrating a configuration of a remote driving service center according to Embodiment 2.

FIG. 11 is a block diagram illustrating a configuration of the remote driving service center 200B. The remote driving service center 200B includes a communication unit 81, the remote operation facility 82, a map storage 83, an operator arrangement unit 84, a reservation storage 85, an operator DB 86, and a display 87. The communication unit 81, the map storage 83, the operator arrangement unit 84, the reservation storage 85, and the operator DB 86 are configured on a server. In other words, the remote driving service center 200B includes a remote driving server.

The communication unit 81 communicates with the driving plan generating apparatus 100B and an operator terminal 58 of a non-resident operator via the network 57.

The map data covering at least a planned travel route of the vehicle is stored in the map storage 83. This map data is used for notifying a candidate operator of a remote operation section.

The operator arrangement unit 84 sounds appropriate operators out on a remote operation based on management information on the operators stored in the operator DB 86, and assigns the remote operation to an operator who accepted the operation.

Information on the successful reservation on the remote operation is stored in the reservation storage 85. This information includes information on a time at which a remote operation will be performed, the position information on a selected section in which the remote operation will be performed, identification information of the assigned operator, and information on an execution status of the reservation.

The display 87 is, for example, a liquid crystal display, and displays a reservation status and an execution status using the information stored in the reservation storage 85. A manager of the remote driving service center 200B or the waiting operators can understand the reservation status and the execution status through the display 87.

The remote operation facility 82 is a facility for the operator to remotely operate the vehicle, and has functions of a driving simulator. The remote operation facility 82 includes an input unit for controlling the steering wheel, the brake, the accelerator, and the other devices of the vehicle. The remote operation facility 82 obtains, from the remote driving interface 53, surrounding information and vehicle control information that are necessary for the remote operation, and displays these pieces of information. Furthermore, the remote operation facility 82 transmits, to the remote driving interface 53, a remote operation signal corresponding to an operation of the operator. The driving control apparatus 51 obtains the remote operation signal through the remote driving interface 53, and controls, in the remote driving mode, the driving of the vehicle based on the remote operation signal.

Figures 12, 13:
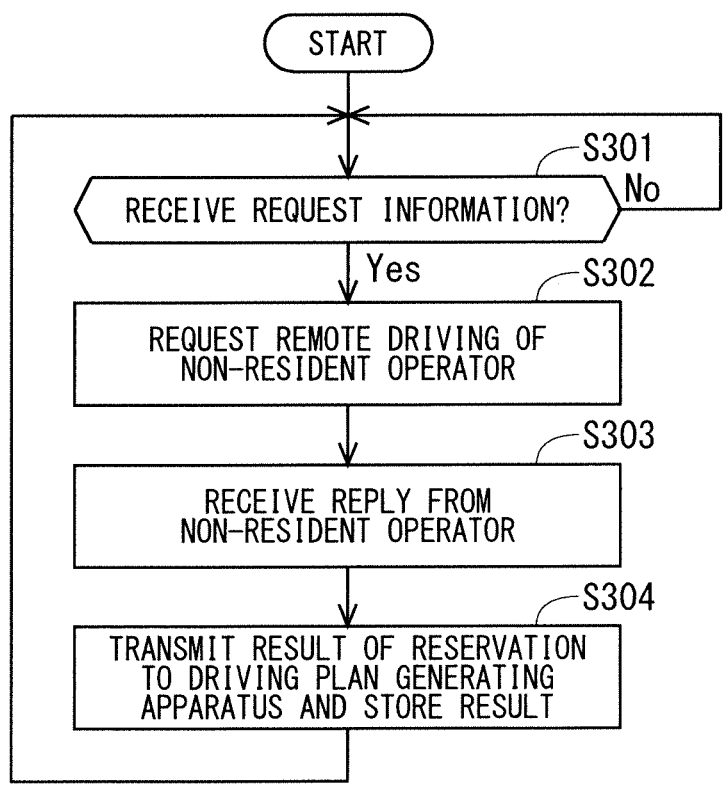
FIG. 12 illustrates operator management information according to Embodiment 2.
FIG. 13 is a flowchart illustrating reservation receiving processes of the remote driving service center according to Embodiment 2.

FIG. 12 exemplifies the management information on the non-resident operators which is stored in the operator DB 86. The management information on the non-resident operators includes, for example, information on identification IDs, contact numbers, and working hours of the operators.

FIG. 13 is a flowchart illustrating reservation receiving processes of the remote driving service center 200B. The reservation receiving processes of the remote driving service center 200B will be described with reference to the procedure in FIG. 13. First, the operator arrangement unit 84 determines whether the communication unit 81 has received the reservation information on the remote operation from the driving plan generating apparatus 100B (Step S301). The operator arrangement unit 84 waits until the communication unit 81 receives the reservation information. Once the communication unit 81 has received the reservation information, the operator arrangement unit 84 requests a remote operation of a non-resident operator with reference to the management information in the operator DB 86 (Step S302). For example, the operator arrangement unit 84 requests an operator who can come on duty at a scheduled traveling time of the selected section, with reference to the item on the working hours in the management information. For example, the communication unit 81 transmits a message to the operator terminal 58 owned by the non-resident operator to request the remote operation. In such a case, the operator arrangement unit 84 may obtain the map data from the map storage 83 to generate a map illustrating the selected section, and transmit the map to the operator terminal 58 to notify the non-resident operator of the position information on the selected section.

Next, the communication unit 81 receives a reply to the request of the remote operation from the non-resident operator (Step S303). For example, the operator terminal 58 of the non-resident operator transmits a message to the communication unit 81 as a reply to the request of the remote operation. When the communication unit 81 receives, from the non-resident operator, a reply indicating that the remote operation is possible, the operator arrangement unit 84 assigns the remote operation to the non-resident operator. The communication unit 81 transmits a result of the reservation to the driving plan generating apparatus 100B as "reservation accepted" if the reply of the non-resident operator is affirmative or "reservation rejected" if the reply is negative. Furthermore, the operator arrangement unit 84 stores the result of the reservation in the reservation storage 85 (Step S304).

The procedure above assumes that the operator arrangement unit 84 requests a remote operation of a single non-resident operator. However, the operator arrangement unit 84 may request a remote operation of a plurality of non-resident operators. For example, the operator arrangement unit 84 can simultaneously request a remote operation of a plurality of non-resident operators who satisfy conditions including the working hours, and assign the remote operation to a non-resident operator who replies that the remote operation is possible. Upon receipt of the replies indicating that the remote operation is possible from a plurality of non-resident operators, the operator arrangement unit 84 can select one of the non-resident operators and assign the remote operation to the selected non-resident operator. Alternatively, the operator arrangement unit 84 may assign priorities to the plurality of non-resident operators who satisfy conditions including the working hours, and request the remote operation of the plurality of non-resident operators in descending order of the priorities.

Figure 14:
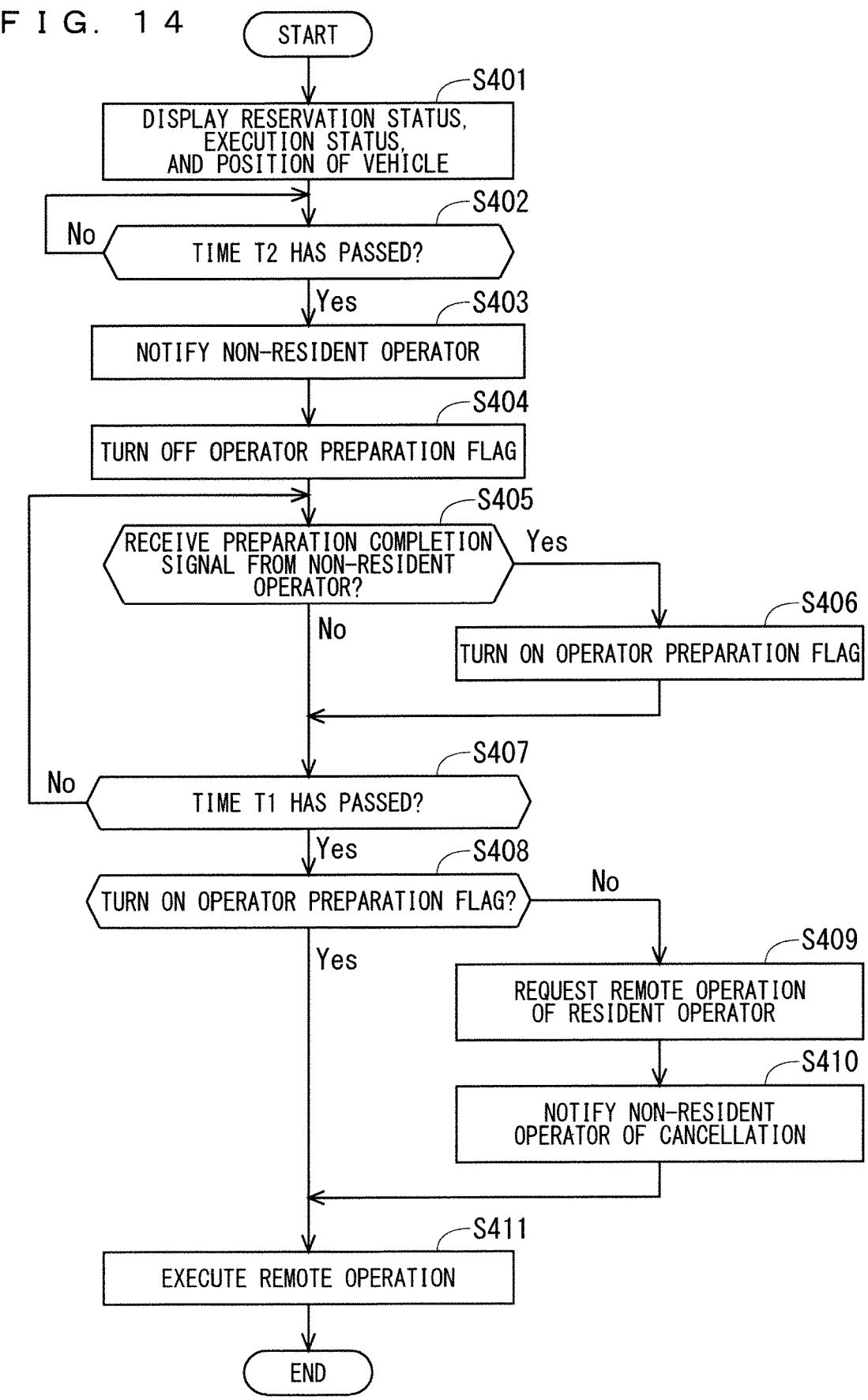
FIG. 14 is a flowchart illustrating processes for executing a remote operation by the remote driving service center according to Embodiment 2.

FIG. 14 is a flowchart illustrating processes for executing the remote operation by the remote driving service center 200B. The processes for executing the remote operation by the remote driving service center 200B will be described with reference to the procedure in FIG. 14. First, the display 87 displays a reservation status and an execution status of the remote operation, and the position of the vehicle (Step S401). Next, the operator arrangement unit 84 determines whether a time T2 has passed (Step S402). The time T2 is a scheduled time at which the vehicle starts traveling through the selected section, that is, a time preceded by a time margin from a start time T of the remote operation. For example, the time T2 is 30 minutes before the start time T of the remote operation.

After the time T2 has passed, the communication unit 81 notifies the non-resident operator to which the remote operation has been assigned that the start time T of the remote operation is approaching (Step S403). The communication unit 81 makes this notification, for example, by transmitting a predetermined message to the operator terminal 58 of the non-resident operator. Then, the operator arrangement unit 84 turns off an operator preparation flag (Step S404). The operator preparation flag is included in, for example, the management information on the non-resident operators stored in the operator DB 86.

If the non-resident operator who has received the notification from the communication unit 81 in Step S403 is ready for the remote operation, he/she transmits a preparation completion signal to the communication unit 81 using the operator terminal 58. Once the communication unit 81 receives the preparation completion signal (Yes in Step S405), the operator arrangement unit 84 turns on the operator preparation flag (Step S406), and the processes for executing the remote operation proceed to Step S407. When the communication unit 81 does not receive the preparation completion signal (No in Step S405), the processes for executing the remote operation proceed to Step S407 with the operator preparation flag turned off The operator arrangement unit 84 determines whether a time T1 has passed in Step S407 (Step S407). The time T1 is a time between the time T2 and the start time T of the remote operation, for example, 15 minutes before the start time T of the remote operation. The operator arrangement unit 84 determines whether the operator preparation flag is turned on when the time T1 has passed (Step S408). The operator preparation flag is turned on in Step S406 if the communication unit 81 receives the preparation completion signal from the non-resident operator until the time T1. In such a case, when the start time T arrives, the non-resident operator executes the remote operation using the remote operation facility 82 (Step S411).

The operator preparation flag remains off if the communication unit 81 does not receive the preparation completion signal from the non-resident operator until the time T1. Here, the operator arrangement unit 84 requests the remote operation of a resident operator (Step S409), and notifies the assigned non-resident operator of cancellation of the remote operation (Step S410). The operator arrangement unit 84 makes this notification in Step S410, for example, by transmitting a predetermined message to the operator terminal 58 of the non-resident operator, similarly to the notification in Step S403. The resident operator waits in the remote driving service center 200B. For example, the manager of the remote driving service center 200B requests the remote operation of the resident operator through direct communication. When the start time T arrives, the resident operator executes the remote operation using the remote operation facility 82 (Step S411). As described above, the processes for executing the remote operation by the remote driving service center 200B end.

[B-3. Modifications]

Figure 15:
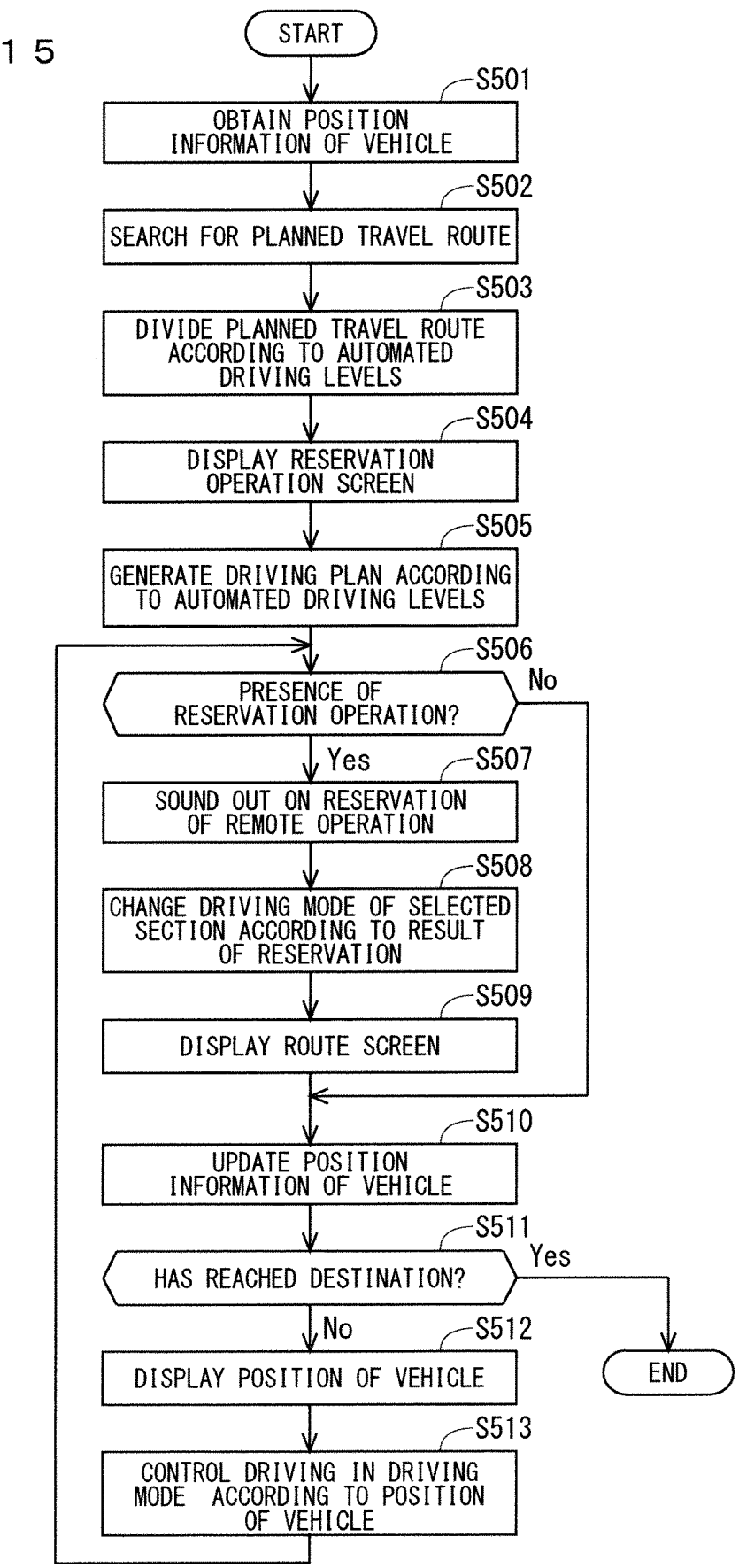
FIG. 15 is a flowchart indicating operations of a driving plan generating apparatus according to a modification of Embodiment 2.

In the procedure of FIG. 4, the driving plan generating apparatus 100B accepts the reservation of the remote operation within a certain period of time through the display of the reservation operation screen. However, the driving plan generating apparatus 100B may accept the reservation of the remote operation at any time until the vehicle reaches a destination. FIG. 15 is a flowchart indicating operations of the driving plan generating apparatus 100B that accepts the reservation of the remote operation at any time. The operations of the driving plan generating apparatus 100B will be described with reference to FIG. 15.

Steps S501 to S504 in the procedure of FIG. 15 are identical to Steps S201 to S204 in the procedure of FIG. 4, respectively. After causing the display 55 to display the reservation operation screen in Step S504, the controller 11 generates a driving plan according to the automated driving levels (Step S505). In this step, the driving modes are determined for all the sections in a planned travel route even when the remote operation is reserved later.

Next, the driving plan generating apparatus 100B determines the presence of the reservation operation (Step S506). In the presence of the reservation operation, the driving plan generating apparatus 100B requests the remote driving service center 200B to reserve the remote operation (Step S507). Then, the driving plan generating apparatus 100B changes a driving mode of a selected section, according to a result of the reservation received from the remote driving service center 200B (Step S508). In other words, the driving plan generating apparatus 100B changes the driving mode in the selected section from the incompletely automated driving mode to the remote driving mode if the reservation is accepted. Next, the controller 11 updates the display of the driving mode in the selected section of the planned travel route, in the reservation operation screen (Step S509). In the absence of a reservation operation, Steps S508 and S509 are not performed.

Then, Steps S510 to S513 are identical to Steps S211 to S214 in FIG. 4, respectively. If the vehicle has not reached the destination, the processes return to Step S506 after Step S513, and the driving plan generating apparatus 100B receives a reservation operation. Thus, the driving plan generating apparatus 100B accepts the reservation of the remote operation at any time until the vehicle reaches a destination in the procedure of FIG. 15.

When sounding the remote driving service center 200B out on a reservation of a remote operation in the selected section once and obtaining a result indicating the reservation rejected, the driving plan generating apparatus 100B gives up the remote operation in the selected section and determines the incompletely automated driving mode as the driving mode in the selected section. However, even after obtaining a result indicating the reservation rejected from the remote driving service center 200B, the driving plan generating apparatus 100B may repeatedly sound out on the reservation of the remote operation until the vehicle starts traveling through the selected section. This can increase the probability of accomplishing the reservation of the remote operation.

Figure 16:
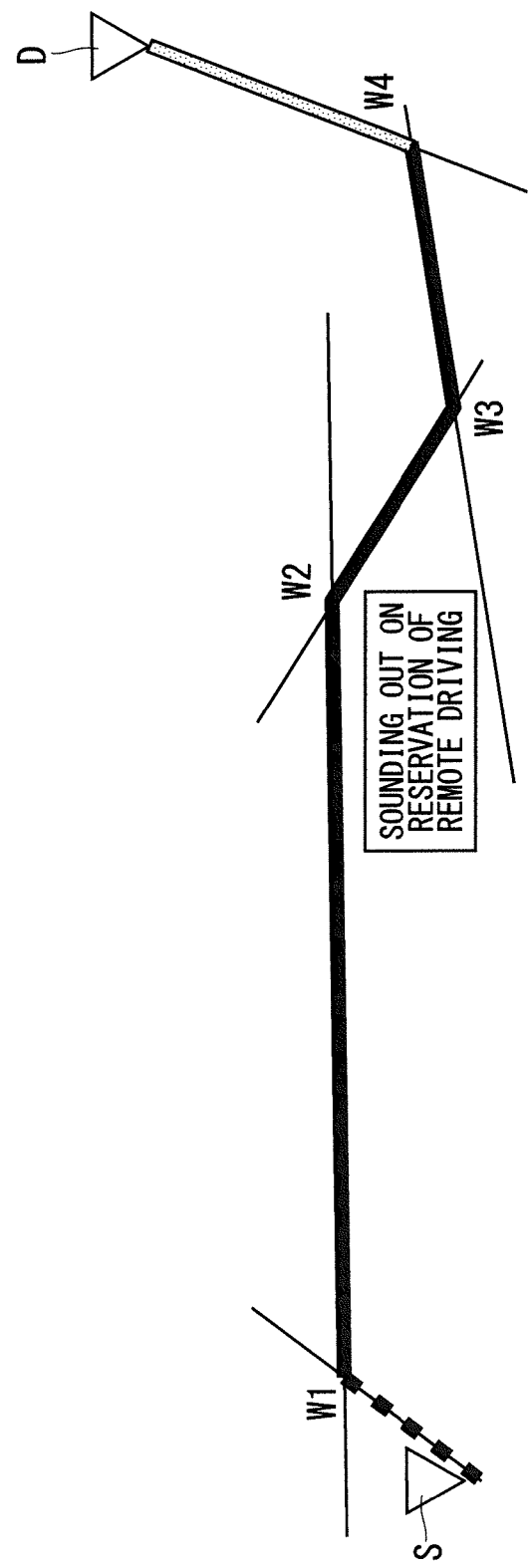
FIG. 16 illustrates an example route screen when a reservation is continuously sounded out according to a modification of Embodiment 2.

In such a case, the route screen as illustrated in FIG. 16 is displayed. FIG. 16 illustrates the route screen when the section W2-W3 is a selected section and a result indicating the reservation rejected is obtained from the remote driving service center 200B. A message "SOUNDING OUT ON RESERVATION OF REMOTE OPERATION" is attached to the section W2-W3. Although the section W2-W3 is displayed in the solid line in FIG. 16, using a display mode such as blinking this solid line may explicitly indicate that the section W2-W3 is a section which is being sounded out on a reservation of the remote operation. The route screen as illustrated in FIG. 16 is displayed until the vehicle passes through the point W2.

When the vehicle travels in the remote driving mode, all the driving tasks are sometimes remotely operated, or the driving control apparatus 51 sometimes performs a part of the driving tasks through automated control. When the operator remotely operates the driving tasks that the driving control apparatus 51 is supposed to perform through automated control, the driving control apparatus 51 may perform the automated control in disregard of the remote operation, or prioritize the remote operation over the automated control as necessary. Here, when the driving ability of the operator who performs the remote operation is low, the driving control apparatus 51 may disregard the remote operation. Thus, the driving control apparatus 51 may determine what is prioritized based on the driving ability of the operator. Information on the driving ability of the operators is stored in the operator DB 86 as operator management information. The driving control apparatus 51 receives the information through the remote driving I/F 53.

FIGS. 3 and 11 illustrate the configurations of the driving plan generating apparatus 100B and the remote driving service center 200B. However, the functions shared between the driving plan generating apparatus 100B and the remote driving service center 200B are not limited to those illustrated in FIGS. 3 and 11 but may have various modifications. Although, for example, the section selector 12 and the drive planning unit 13 are included in the driving plan generating apparatus 100B according to Embodiment 2, they may be included in the remote driving service center 200B. In such a case, the driving plan generating apparatus 100B transmits a position and a destination of the vehicle to the remote driving service center 200B. Then, the remote driving service center 200B generates a driving plan of the vehicle and transmits it to the driving plan generating apparatus 100B. Furthermore, the remote driving service center 200B may propose the driving plan generated by itself to the driving plan generating apparatus 100B, and the driving plan generating apparatus 100B may consent to the driving plan.

Furthermore, the driving plan generating apparatus 100B and the remote driving service center 200B may share the driving plan and the position of the vehicle, and check whether the mutual operations are accurately performed. Here, when the mutual operations have changes or cause inconveniences in the plan, its own operation may be corrected. For example, when an operator cannot perform the remote operation for some reason, the driving plan generating apparatus 100B notifies the driver of the situation and checks with the driver if he/she can manually drive the vehicle in a section for the remote driving mode. If the manual driving is impossible, the driving control apparatus 51 may perform automated control to park the vehicle in an appropriate parking area.

Furthermore, when the remote driving service center 200B detects a significant delay in the time at which the vehicle travels through the selected section, based on a traveling state of the vehicle, it may negotiate with a non-resident operator or a resident operator to secure an operator who can perform the remote operation at the changed time. When the remote driving service center 200B cannot secure the operator who can perform the remote operation at the changed time, it may notify the circumstance to the driving plan generating apparatus 100B.

[B-4. Advantages]

The driving control apparatus 51 performs, in the remote driving mode through remote operations of an operator, driving tasks other than those defined for automation in the automated driving level of a selected section, and performs, through automated control, the driving tasks defined for automation in the automated driving level of the selected section. Thus, the driving control apparatus 51 can make the automated driving compatible with the remote driving.

The communication unit 17 that is a reservation unit transmits the reservation information to the remote driving server to sound out on a reservation of a remote operation of the vehicle. Consequently, the driving plan generating apparatus 100B can sound out on the reservation of the remote operation of the vehicle.

The drive planning unit 13 sets a driving mode of the vehicle in a section of a planned travel route other than the selected section, based on the automated driving level of the section. Consequently, the driving plan generating apparatus 100B can appropriately set the driving mode of the vehicle based on the automated driving level.

A driving mode of the vehicle in the current section is displayed on the route screen. Thus, the driver can understand the driving mode of the vehicle in the current section through the route screen.

A driving mode of the vehicle in the next section and a distance to the next section are displayed on the route screen. Thus, the driver can understand the driving mode of the vehicle in the next section and the distance to the next section through the route screen, and can be ready for the next section.

When the remote driving server does not accept the reservation, the communication unit 17 that is a reservation unit repeatedly sounds the remote driving server out on a reservation of a remote operation while the vehicle is traveling through a section before the selected section in the planned travel route. This can increase the probability of accomplishing the reservation of the remote operation.

[C. Embodiment 3]

When the driving plan generating apparatus 100C sounds out on a reservation of a remote operation according to Embodiment 3, selection of a non-resident operator who performs the remote operation can be conditioned.

[C-1. Configuration]

Configurations of the driving plan generating apparatus 100C and the remote driving service center 200C according to Embodiment 3 are identical to those of the driving plan generating apparatus 100B and the remote driving service center 200B according to Embodiment 2. FIGS. 3 and 11 illustrate these configurations. The operator management information stored in the operator DB 86 of the remote driving service center 200B includes information on supportable vehicle models as attribute information of the non-resident operators.

FIG. 17 illustrates operator management information according to Embodiment 3. This operator management information includes information on supported vehicle models. For example, a non-resident operator with an ID of 001 supports remote operations of sedan and minivan type vehicles. The operator management information may include detailed settings of the supported vehicle models, such as car manufacturers and model numbers. Furthermore, the operator management information may include not the supportable vehicle models but values representing levels of skill for the respective vehicle models.

The driving plan generating apparatus 100C transmits the reservation information to the remote driving service center 200C to sound out on a reservation of a remote operation in a selected section. This reservation information includes information on the vehicle model. In other words, the driving plan generating apparatus 100C sounds out on a reservation of a remote operation with the vehicle model specified, so that it can wish assignment of an operator who can remotely operate the specified vehicle model, that is, a skilled operator.

[C-2. Operations]

FIG. 18 illustrates transitions of a reservation operation screen. FIG. 18 omits the illustration of the planned travel route. The screen A1 is an initial screen of the reservation operation screen, and displays the remote operation reservation button. Once the driver selects the remote operation reservation button, the reservation operation screen transitions from the screen A1 to the screen A2. The screen A2 displays a "VEHICLE MODEL SPECIFIED" button and a "VEHICLE MODEL NOT SPECIFIED" button. If the driver wishes an operator skilled in the remote operation of the vehicle model of the vehicle of the driver, he/she selects the "VEHICLE MODEL SPECIFIED" button. If there is no preference on the vehicle models supported by an operator, he/she selects the "VEHICLE MODEL NOT SPECIFIED" button. When the "VEHICLE MODEL NOT SPECIFIED" button is selected on the screen A2, the driving plan generating apparatus 100C transmits, to the remote driving service center 200C, the reservation information including a scheduled time of a remote operation and the position information on the selected section to sound out on a reservation of the remote operation with the "VEHICLE MODEL NOT SPECIFIED". When the driving plan generating apparatus 100C receives a result of the reservation accepted from the remote driving service center 200C, the reservation operation screen transitions from the screen A2 to the screen A6. The screen A6 displays a status "RESERVATION COMPLETION WITH VEHICLE MODEL NOT SPECIFIED". When the driving plan generating apparatus 100C receives a result of the reservation rejected from the remote driving service center 200C, the reservation operation screen transitions from the screen A2 to the screen A7. The screen A7 displays a status "UNSUCCESSFUL RESERVATION".

When the "VEHICLE MODEL SPECIFIED" button is selected on the screen A2, the driving plan generating apparatus 100C transmits, to the remote driving service center 200C, the reservation information including the scheduled time of the remote operation, the position information on the selected section, and information on the specified vehicle model. Then, the remote driving service center 200C requests a non-resident operator who can support the specified vehicle model to perform the remote operation, with reference to the operator management information using the operator arrangement unit 84. When the remote operation can be assigned to the non-resident operator who can support the specified vehicle model, the remote driving service center 200C transmits the result of the reservation to the driving plan generating apparatus 100C. Then, the reservation operation screen transitions from the screen A2 to the screen A3. The screen A3 displays a status "RESERVATION COMPLETION WITH VEHICLE MODEL SPECIFIED".

If the operator arrangement unit 84 of the remote driving service center 200C cannot assign the remote operation to the non-resident operator who can support the specified vehicle model in response to the reservation of the remote operation with the vehicle model specified, it requests the next non-resident operator who can support a vehicle model similar to the specified vehicle model to perform the remote operation. If the non-resident operator who can support the vehicle model similar to the specified vehicle model can perform the remote operation, the operator arrangement unit 84 temporarily assigns the remote operation to the non-resident operator. The remote driving service center 200C transmits the result of the reservation to the driving plan generating apparatus 100C. Then, the reservation operation screen transitions from the screen A2 to the screen A4. The screen A4 displays a "RESERVATION WITH SIMILAR VEHICLE MODEL" button and a cancellation button. Once the "RESERVATION WITH SIMILAR VEHICLE MODEL" button is selected on the screen A4, the driving plan generating apparatus 100C notifies the remote driving service center 200C of a wish to reserve a non-resident operator who supports the similar vehicle model. Then, the operator arrangement unit 84 of the remote driving service center 200C duly assigns the remote operation to the non-resident operator who can support the similar vehicle model. Then, the reservation operation screen transitions from the screen A4 to the screen A8. The screen A8 displays a status "RESERVATION COMPLETION WITH SIMILAR VEHICLE MODEL".

Once the cancellation button is selected on the screen A4, the driving plan generating apparatus 100C notifies the remote driving service center 200C to cancel the reservation. The operator arrangement unit 84 of the remote driving service center 200C notifies the non-resident operator who can support the similar vehicle model of the cancelation of the remote operation. Then, the reservation operation screen transitions from the screen A4 to the screen A7. The screen A7 displays the status "UNSUCCESSFUL RESERVATION".

When the operator arrangement unit 84 of the remote driving service center 200C can assign neither the non-resident operator who can support the specified vehicle model nor the non-resident operator who can support the similar vehicle model in response to the reservation of the remote operation with the vehicle model specified, it requests all the non-resident operators except for these (hereinafter referred to as "normal non-resident operators") to perform the remote operation. If one of the normal non-resident operators can perform the remote operation, the operator arrangement unit 84 temporarily assigns the remote operation to the normal non-resident operator. The remote driving service center 200C transmits the result of the reservation to the driving plan generating apparatus 100C. Then, the reservation operation screen transitions from the screen A2 to the screen A5. The screen A5 displays a "RESERVATION WITH VEHICLE MODEL NOT SPECIFIED" button and a cancellation button. Once the "RESERVATION WITH VEHICLE MODEL NOT SPECIFIED" button is selected on the screen A5, the driving plan generating apparatus 100C notifies the remote driving service center 200C of a wish to reserve the normal non-resident operator. Then, the operator arrangement unit 84 of the remote driving service center 200C duly assigns the remote operation to the normal non-resident operator. Then, the reservation operation screen transitions from the screen A5 to the screen A9. The screen A9 displays the status "RESERVATION COMPLETION WITH VEHICLE MODEL NOT SPECIFIED".

Once the cancellation button is selected on the screen A5, the driving plan generating apparatus 100C notifies the remote driving service center 200C to cancel the reservation. Then, the operator arrangement unit 84 of the remote driving service center 200C notifies the normal non-resident operator of the cancellation of the remote operation.

Then, the reservation operation screen transitions from the screen A5 to the screen A7. The screen A7 displays the status "UNSUCCESSFUL RESERVATION".

The modifications in B-3 are applicable to Embodiment 3. In other words, the driving plan generating apparatus 100C allows reservation with the similar vehicle model and further with the vehicle model not specified if the reservation with the vehicle model specified is unsuccessful in the description above. The driving plan generating apparatus 100C may repeatedly sound the remote driving service center 200C out on the reservation of the remote operation of the vehicle until a reservation with a vehicle model specified becomes successful.

[C-3. Modifications]

FIGS. 17 and 18 illustrate that the driving plan generating apparatus 100C sounds out on a reservation of a remote operation with a vehicle model specified. The vehicle model is an example attribute of non-resident operators. The other elements including a support area, the age, the gender, and a level of skill may become attributes of the non-resident operators. In other words, the operator management information may include not only the information on supported vehicle models illustrated in FIG. 17 but also information on the areas that can be supported by the non-resident operators, and the ages and the genders of the non-resident operators. Consequently, the driving plan generating apparatus 100C can sound out, with an area including a selected section specified, on a reservation of a remote operation to be performed by a non-resident operator skilled in the driving in the area. Alternatively, the driving plan generating apparatus 100C can sound out on a reservation of a remote operation with the age and the gender of the non-resident operator specified. For example, when the driver is a male in his thirties, the driving plan generating apparatus 100C sounds out on a reservation of a remote operation to be performed also by a non-resident male operator in his thirties, so that a remote operation similar to the actual driving operation performed by the driver is possible.

[C-4. Advantages]

The reservation information to be transmitted from the driving plan generating apparatus 100C to the remote driving service center 200C includes information on the vehicle models according to Embodiment 3. Thus, the remote driving service center 200C can assign a remote operation to a non-resident operator who is familiar with operations of the vehicle model subjected to the remote operation.

[D. Embodiment 4]

[D-1. Configuration]

Configurations of the driving plan generating apparatus 100D and a remote driving service center 200D according to Embodiment 4 are identical to those of the driving plan generating apparatus 100B and the remote driving service center 200B according to Embodiment 2. FIGS. 3 and 11 illustrate these configurations.

[D-2. Operations]

Figure 19:
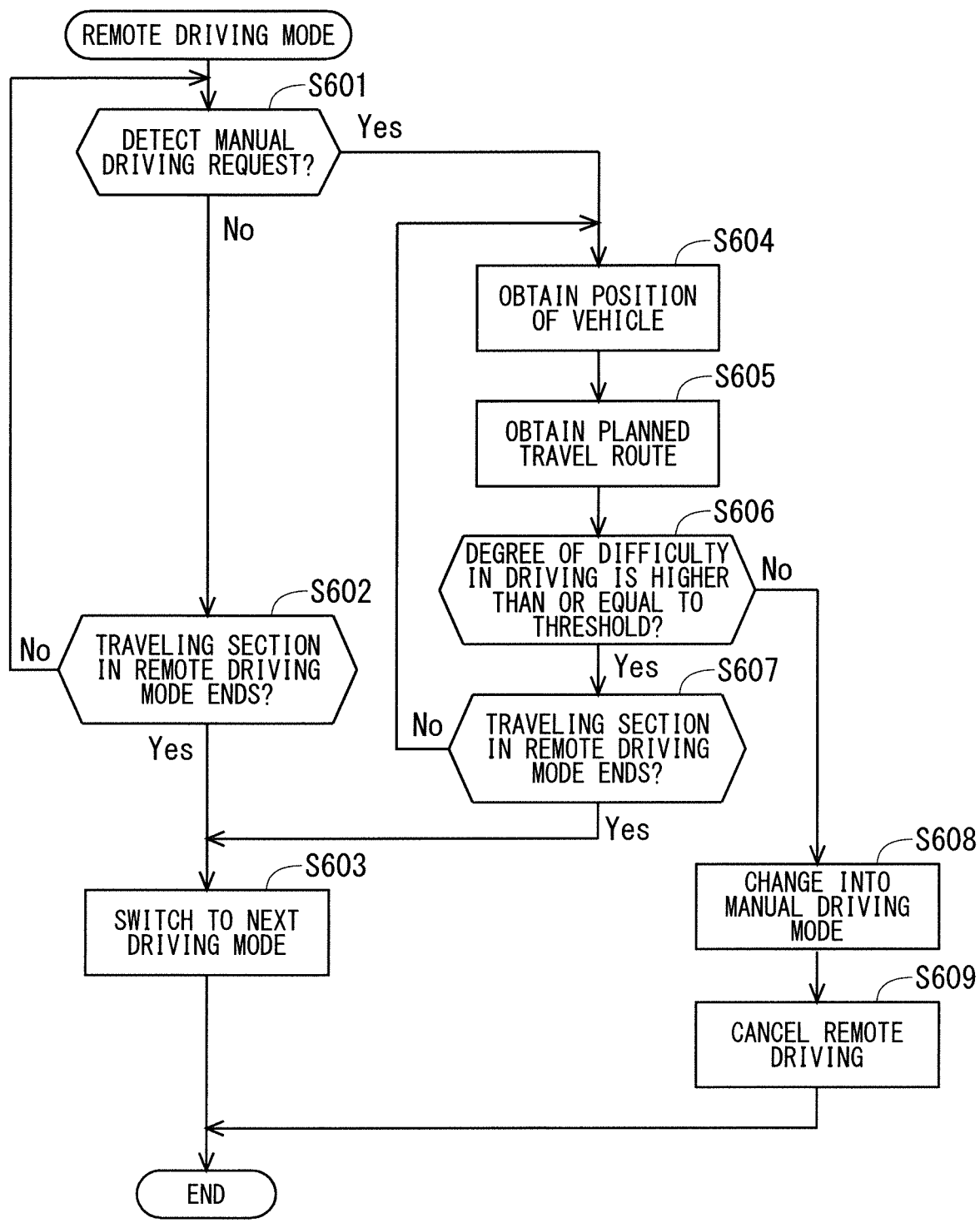
FIG. 19 is a flowchart indicating operations of a driving plan generating apparatus according to Embodiment 4.

The driving plan generating apparatus 100D performs operations of switching the driving mode of a vehicle from the remote driving mode to the incompletely automated driving mode, in response to a request for manual driving from the driver, in addition to the operations of the driving plan generating apparatus 100B. FIG. 19 is a flowchart indicating the operations of switching the driving mode to be performed by the driving plan generating apparatus 100D. The operations of switching the driving mode will be described with reference to FIG. 19.

The procedure in FIG. 19 assumes that the driving control apparatus 51 controls the driving of the vehicle according to a traveling plan and the current driving mode of the vehicle is the remote driving mode. The driver can request the driving plan generating apparatus 100D to perform the manual driving through the operating device 56. The manual driving request is a request for switching the driving tasks remotely performed in the remote driving mode to the manual operations of the driver. The controller 11 determines whether the manual driving request has been detected, while the vehicle is traveling through a section in the remote driving mode (Step S601). When the manual driving request is not detected, the controller 11 determines whether the traveling section in the remote driving mode ends (Step S602). If the vehicle finishes traveling in the section in the remote driving mode without detecting the manual driving request by the controller 11, the driving control apparatus 51 switches the driving mode of the vehicle to a driving mode which is specified for the next section in the driving plan (Step S603). The operations in Steps S601 to S603 are identical to the operations of the driving control apparatus 51 in the other Embodiments.

When the controller 11 detects the manual driving request, the drive planning unit 13 obtains the position of the vehicle from the positioning unit 15 (Step S604), and further obtains a planned travel route from the section selector 12 (Step S605). Then, the drive planning unit 13 calculates a degree of difficulty in driving the remaining sections in the remote driving mode, from the position of the vehicle and the planned travel route, and determines whether the degree of difficulty in driving is higher than or equal to a threshold (Step S606).

The drive planning unit 13 calculates the degree of difficulty in driving from the number of right and left turns and the number of lane changes in the remaining sections in the remote driving mode. Alternatively, the drive planning unit 13 may calculate the degree of difficulty in driving from the shapes of roads or the amount of traffic in the remaining sections in the remote driving mode. For example, the drive planning unit 13 can set the degree of difficulty in driving higher when a road is serpentine or has a branch point, a merge point, or a tunnel entry/exit point. Furthermore, the drive planning unit 13 may calculate the degree of difficulty in driving, for example, based on an arousal level of the driver or a weather condition.

When the degree of difficulty in driving is lower than the threshold in Step S606, the drive planning unit 13 modifies the driving plan to change the driving mode of the vehicle into the manual driving mode (Step S608). The driving control apparatus 51 does not control the driving of the vehicle in the manual driving mode. Then, the communication unit 17 notifies the remote driving service center 200D of cancellation of the remote operation. The remote driving service center 200D cancels the remote operation (Step S609).

When the degree of difficulty in driving is higher than or equal to the threshold in Step S606, the drive planning unit 13 does not change the driving mode of the vehicle into the manual driving mode. Then, the controller 11 determines whether the traveling section in the remote driving mode ends (Step S607). If the traveling section in the remote driving mode has not ended, the operations of switching the driving mode return to Step S604. If the traveling section in the remote driving mode ends, the driving control apparatus 51 switches the driving mode of the vehicle into a driving mode specified for the next section in the driving plan (Step S603).

[D-3. Modifications]

The drive planning unit 13 may change the driving mode of a fully automated driving section through which the vehicle travels after switching the driving mode of the vehicle into the manual driving mode through the processes above, into the fully automated driving mode without modifying the driving plan. Alternatively, the drive planning unit 13 may cause the driver to select the fully automated driving mode or the manual driving mode a certain period of time before the vehicle travels through the fully automated driving section.

In the procedure of FIG. 19, when the degree of difficulty in driving is lower than the threshold (No in Step S606), the driving mode of the vehicle is immediately changed into the manual driving mode (Step S608). However, the driving mode may be changed into the manual driving mode after an operation of the driver such as operating the steering wheel, the brake, or the accelerator is detected. This can smoothly switch the driving of the vehicle from the remote driving to the manual driving.

The procedure of FIG. 19 describes switching from the remote driving mode to the fully manual driving mode. In response to a request from the driver, the driving plan generating apparatus 100D can switch the driving mode of the vehicle from the remote driving mode to the other incompletely automated driving modes such as the automated driving level 2. The operations in such a case are identical to those in the procedure of FIG. 19.

The drive planning unit 13 may switch the driving mode of the vehicle from the remote driving mode to a target incompletely automated driving mode through another incompletely automated driving mode higher in automated driving level than the target incompletely automated driving mode. For example, when switching the driving mode of the vehicle from the remote driving mode to an incompletely automated driving mode in the automated driving level 0, in the case where the automated driving level allowed in the current traveling section of the vehicle is 3, the drive planning unit 13 switches the driving mode into the incompletely automated driving mode in the automated driving level 0 through the incompletely automated driving mode in the automated driving level 3. Here, the duration of the incompletely automated driving mode in the automated driving level 3 is, for example, 5 minutes. Being once routed through the incompletely automated driving mode in a higher automated driving level enables the driver to be ready for the incompletely automated driving mode in a lower automated driving level.

[D-4. Advantages]

Upon receiving, from a user, an input operation indicating switching of the driving mode of the vehicle in a selected section from the remote driving mode to the incompletely automated driving mode, the drive planning unit 13 calculates the degree of difficulty in driving the selected section, and switches the driving mode when the degree of difficulty in driving is lower than a threshold. This enables the driver from avoiding a trouble in the driving operation after the driving mode is switched to the incompletely automated driving mode.

The drive planning unit 13 switches the driving mode from the remote driving mode to a target incompletely automated driving mode through an incompletely automated driving mode higher in automated driving level than the target incompletely automated driving mode. This enables the driver to be ready for the incompletely automated driving mode in a lower automated driving level.

[E. Other Modifications]

Figure 20:
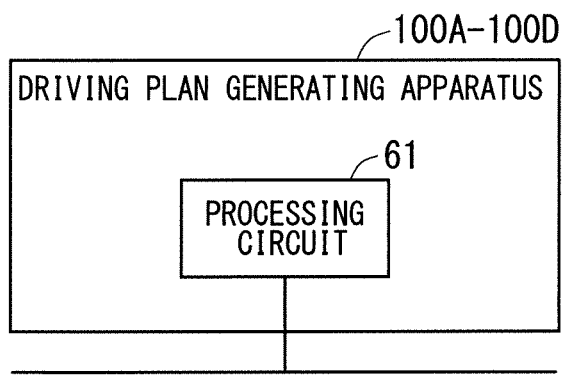
FIG. 20 illustrates a hardware configuration of the driving plan generating apparatus.

The constituent elements of the driving plan generating apparatuses 100A to 100D described above are implemented by a processing circuit 61 illustrated in FIG. 20. Furthermore, the configuration for realizing the remote driving server in the remote driving service centers 200B to 200D is also implemented by the processing circuit 61 illustrated in FIG. 20. In other words, the processing circuit 61 includes the controller 11, the positioning unit 15, the map storage 16, and the communication unit 17 (hereinafter referred to as "the controller 11, etc.,") that are included in the driving plan generating apparatus, the communication unit 81, the map storage 83, the operator arrangement unit 84, the reservation storage 85, and the operator DB 86 (hereinafter referred to as "the operator arrangement unit 84, etc.,"). The processing circuit 61 may be dedicated hardware, or a processor that executes a program stored in a memory. The processor is, for example, a central processing unit, a processing unit, an arithmetic unit, a microprocessor, a microcomputer, or a Digital Signal Processor (DSP).

When the processing circuit 61 is dedicated hardware, it is, for example, a single circuit, a composite circuit, a programmed processor, a parallel-programmed processor, an Application Specific Integrated Circuit (ASIC), a Field-Programmable Gate Array (FPGA), or any combinations thereof. The functions of each of the units such as the controller 11, etc., and the operator arrangement unit 84, etc., may be implemented by a plurality of processing circuits 61, or the functions of the units may be collectively implemented by a single processing circuit.

Figure 21:
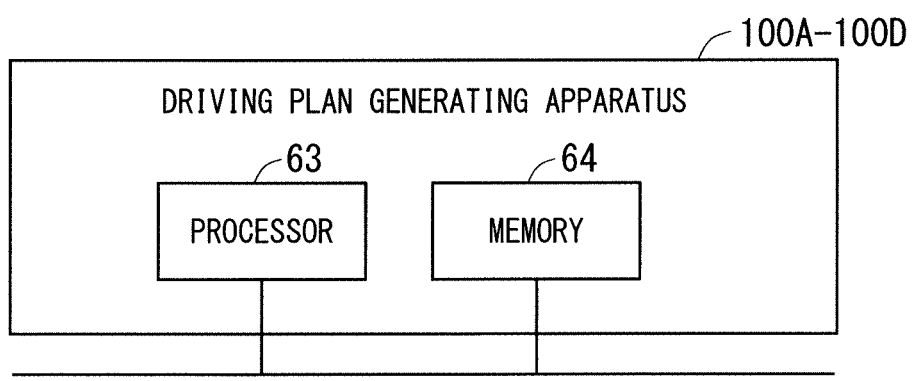
FIG. 21 illustrates a hardware configuration of the driving plan generating apparatus.

When the processing circuit 61 is a processor, the functions of the controller 11, etc., and the operator arrangement unit 84, etc., are implemented by any combinations of software, etc. (software, firmware, or the software and the firmware). For example, the software is described as a program, and stored in a memory. As illustrated in FIG. 21, a processor 63 corresponding to the processing circuit 61 implements the functions of each of the units by reading and executing a program stored in a memory 64. In other words, each of the driving plan generating apparatuses and the remote driving server includes the memory 64 for storing a program which, when executed by the processing circuit 61, consequently executes the steps of: selecting, as a selected section in a planned travel route of a vehicle whose driving is controlled by a driving control apparatus, a section to which an automated driving level involving a driving task to be performed by a passenger has been set; sounding out on a reservation of a remote operation of the vehicle in the selected section, based on reservation information including position information on the selected section and information on a scheduled time at which the vehicle travels through the selected section; and generating a driving plan based on a result of the reservation, the driving plan specifying, as a driving mode of the vehicle in the selected section, one of a remote driving mode in which the driving control apparatus performs at least a part of driving tasks through the remote operation performed by a remote operator and an incompletely automated driving mode in which the driving control apparatus performs at least the part of driving tasks through an operation of the passenger in the vehicle. Put it differently, this program causes a computer to execute the procedure or the method for the controller 11, etc., and the operator arrangement unit 84, etc. Here, the memory 64 is, for example, a non-volatile or volatile semiconductor memory such as a random-access memory (RAM), a read-only memory (ROM), a flash memory, an electrically programmable read-only memory (EPROM), or an electrically erasable programmable read-only memory (EEPROM), a hard disk drive (HDD), a magnetic disk, a flexible disk, an optical disk, a compact disc, a minidisc, a digital versatile disk (DVD) or a drive device thereof, or further any storage medium to be used in future.

The configuration for implementing each of the functions of the controller 11, etc., and the operator arrangement unit 84, etc., using one of the hardware and the software, etc., is described above. However, the configuration is not limited to this but a part of the controller 11, etc., may be implemented by dedicated hardware, and another part thereof may be implemented by software, etc.

As described above, the processing circuit can implement each of the functions by hardware, software, etc., or any combinations of these. The map storages 16 and 83, the reservation storage 85, and the operator DB 86, which are include in the memory 64, may be included in the single memory 64, or may be individual memories.

Although FIG. 3 illustrates the driving plan generating apparatuses 100B to 100D as in-vehicle apparatuses, the driving plan generating apparatuses 100B to 100D are applicable to a system built by appropriately combining, for example, an in-vehicle apparatus, a Portable Navigation Device (PND), communication terminals (e.g., mobile terminals such as a mobile phone, a smartphone, and a tablet), functions of applications to be installed into these communication terminals, and a server. The functions and the constituent elements of the driving plan generating apparatuses 100B to 100D described above may be dispersively allocated to each device for building the system or allocated to any one of the devices in a centralized manner.

Embodiments above describe that, for example, the driving plan generating apparatuses 100B to 100D sound the remote driving service centers 200B to 200D out on reservations of remote operations, respectively. However, sounding out the reservation does not require an in-vehicle apparatus, but may be performed using a device such as a PC or a communication terminal. In other words, the communication unit 17 may be a device such as a PC or a communication terminal. When a communication terminal sounds out the reservation, the communication terminal may transmit a position and a destination of a vehicle to each of the remote driving service centers 200B to 200D. After the reservation is finalized, the communication terminal may communicate a reservation status to a corresponding one of the driving plan generating apparatuses 100B to 100D before or after traveling of the vehicle. Furthermore, the remote driving service centers 200B to 200D may transmit reservation statuses to the driving plan generating apparatuses 100B to 100D, respectively.

Implementing the communication unit 17 using a device such as a PC or a communication terminal enables sounding out a reservation of a remote operation and finalization of the reservation before the vehicle starts traveling. The remote driving service centers 200B to 200D gain some leeway to secure non-resident operators. The remote driving service centers 200B to 200D may offer a comparatively inexpensive price to a reservation with earlier sounding out timing. For example, the remote driving service centers 200B to 200D can individually change the price, for example, one week before, three days before, the day before, or before departure on the day of a remote operation.

Embodiments and Modifications of the present invention can be freely combined, and appropriately modified or omitted within the scope of the invention.

Although the present invention is described in detail, the foregoing description is in all aspects illustrative and does not restrict the invention. It is therefore understood that numerous modifications and variations that have not yet been exemplified can be devised without departing from the scope of the invention.

Embodiments of the present invention can be freely combined, and appropriately modified or omitted within the scope of the invention. Although the present invention is described in detail, the foregoing description is in all aspects illustrative and does not restrict the invention. It is therefore understood that numerous modifications and variations that have not yet been exemplified can be devised without departing from the scope of the invention.

EXPLANATION OF REFERENCE SIGNS

11 controller, 12 section selector, 13 drive planning unit, 14 reservation unit, 15 positioning unit, 16 map storage, 17 communication unit, 21 remote operation reservation button, 22 tachometer, 23 fuel gauge, 24 display area, 25 instrument panel, 26 vehicle icon, 27 mode bar, 51 driving control apparatus, 52 surrounding information detector, 53 remote driving interface, 55 display, 56 operating device, 57 network, 58 operator terminal, 61 processing circuit, 63 processor, 64 memory, 100A, 100B, 100C, 100D driving plan generating apparatus, 200B, 200C, 200D remote driving service center.

The invention claimed is:

1. A driving plan generating apparatus, comprising:
 a processor to execute a program; and
 a memory to store the program which, when executed by the processor, performs preprocess of:
 selecting, as a selected section in a planned travel route of a vehicle whose driving is controlled by a driving control apparatus, at least one of incompletely automated driving sections to which an automated driving level involving a driving task to be performed by a passenger has been set;
 sounding out on a reservation of a remote operation of the vehicle in the selected section, based on reservation information including position information on the selected section and information on a scheduled time at which the vehicle travels through the selected section; and
 generating a driving plan based on a result of the reservation, the driving plan specifying, as a driving mode of the vehicle in the selected section, a remote driving mode in which the driving control apparatus performs at least a part of driving tasks through the remote operation performed by an operator outside the vehicle when the reservation is accepted, and an incompletely automated driving mode in which the driving control apparatus performs at least the part of driving tasks through an operation of the passenger in the vehicle when the reservation is rejected,
 wherein the driving control apparatus controls the driving of the vehicle according to the driving plan.

2. The driving plan generating apparatus according to claim 1,
 wherein in the remote driving mode:
 the driving control apparatus performs, through the remote operation performed by the operator, a driving task other than a driving task defined for automation in an automated driving level of the selected section; and
 the driving control apparatus performs, through automated control, the driving task defined for automation in the automated driving level of the selected section.

3. The driving plan generating apparatus according to claim 1,
 wherein the sounding out includes transmitting the reservation information to a remote driving server.

4. The driving plan generating apparatus according to claim 1,
 wherein a driving mode of the vehicle in a section other than the selected section in the planned travel route is set based on an automated driving level of the section.

5. The driving plan generating apparatus according to claim 4,
wherein when executed by the processor, the program further performs a process of generating a route screen for displaying a driving mode of a current section of the vehicle in the planned travel route.

6. The driving plan generating apparatus according to claim 5,
wherein a driving mode of the vehicle in a next section and a distance to the next section in the planned travel route are displayed on the route screen.

7. The driving plan generating apparatus according to claim 3,
wherein when the remote driving server does not accept the reservation, the remote driving server is repeatedly sounded out on the reservation while the vehicle is traveling through a section before the selected section in the planned travel route.

8. The driving plan generating apparatus according to claim 1,
wherein the reservation information includes information on a vehicle model of the vehicle.

9. The driving plan generating apparatus according to claim 1,
wherein when the driving plan generating apparatus receives, from a user, an input operation indicating switching of the driving mode of the vehicle in the selected section from the remote driving mode to the incompletely automated driving mode, a degree of difficulty in driving the selected section is calculated, and the driving mode is switched when the degree of difficulty in driving is lower than a threshold.

10. The driving plan generating apparatus according to claim 9,
wherein the incompletely automated driving mode includes a plurality of automated driving levels corresponding to an amount of the driving tasks to be performed by the driving control apparatus, and
the driving mode is switched from the remote driving mode to a target incompletely automated driving mode through an incompletely automated driving mode higher in automated driving level than the target incompletely automated driving mode.

11. The driving plan generating apparatus according to claim 1,
wherein, when the operator remotely operates, in the remote driving mode, a driving task that is supposed to be performed through automated control, the driving control apparatus performs, through the remote operation, the driving task that is supposed to be performed through the automated control.

12. The driving plan generating apparatus according to claim 1,
wherein the reservation is made before the vehicle starts traveling through the planned travel route.

13. A remote driving server to:
receive the reservation information from the driving plan generating apparatus according to claim 1; and
assign an operator who remotely drives the vehicle in the selected section, based on the reservation information.

14. A method for generating a driving plan, the method comprising:
selecting, as a selected section in a planned travel route of a vehicle whose driving is controlled by a driving control apparatus, a section to which an automated driving level involving a driving task to be performed by a passenger has been set;
sounding out on a reservation of a remote operation of the vehicle in the selected section, based on reservation information including position information on the selected section and information on a scheduled time at which the vehicle travels through the selected section; and
generating a driving plan based on a result of the reservation, the driving plan specifying, as a driving mode of the vehicle in the selected section, a remote driving mode in which the driving control apparatus performs at least a part of driving tasks through the remote operation performed by a remote operator when the reservation is accepted, and an incompletely automated driving mode in which the driving control apparatus performs at least the part of driving tasks through an operation of the passenger in the vehicle when the reservation is rejected,
wherein the driving control apparatus controls the driving of the vehicle according to the driving plan.

* * * * *